United States Patent
Kuranoshita

(10) Patent No.: US 9,206,013 B2
(45) Date of Patent: Dec. 8, 2015

(54) DATA EDITING APPARATUS, DATA EDITING METHOD, AND NON-TRANSITORY RECORDING MEDIUM STORING PROGRAM

(71) Applicant: FUJIFILM Corporation, Minato-Ku, Tokyo (JP)

(72) Inventor: Masashi Kuranoshita, Minato-ku (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/251,269

(22) Filed: Apr. 11, 2014

(65) Prior Publication Data

US 2014/0309095 A1    Oct. 16, 2014

(30) Foreign Application Priority Data

Apr. 16, 2013    (JP) ................... 2013-085485

(51) Int. Cl.
*G06K 15/00*    (2006.01)
*B65H 43/00*    (2006.01)
*G06F 3/12*    (2006.01)

(52) U.S. Cl.
CPC .............. *B65H 43/00* (2013.01); *G06F 3/125* (2013.01); *G06F 3/1208* (2013.01); *G06F 3/1256* (2013.01); *G06F 3/1285* (2013.01)

(58) Field of Classification Search
CPC ..... G06F 3/1208; G06F 3/125; G06F 3/1256; G03G 2215/00877; G03G 15/6541; G03G 2215/00827; G03G 2215/00932; G03G 15/04018; G03G 15/50; G03G 15/6582; G03G 2215/00426; G03G 2215/0426; H04N 1/00639; H04N 1/44; H04N 1/4453
USPC ............................................. 358/1.18
See application file for complete search history.

(56) References Cited

U.S. PATENT DOCUMENTS

| | | | | |
|---|---|---|---|---|
| 2008/0089612 | A1* | 4/2008 | Isomura | 382/295 |
| 2010/0245872 | A1* | 9/2010 | Narita | 358/1.9 |
| 2011/0077759 | A1* | 3/2011 | Yamasaki | 700/97 |
| 2011/0286040 | A1 | 11/2011 | Seto et al. | |
| 2012/0250036 | A1* | 10/2012 | Hatta et al. | 358/1.2 |

FOREIGN PATENT DOCUMENTS

| | | | |
|---|---|---|---|
| JP | 06-208219 | A | 7/1994 |
| JP | 2898525 | B2 | 6/1999 |
| JP | 2011-017938 | A | 1/2011 |
| JP | 2011-070449 | A | 4/2011 |
| JP | 2011242977 | A | 12/2011 |
| JP | 2012141857 | A | 7/2012 |

OTHER PUBLICATIONS

Rejection of the Application, dated May 7, 2015, issued in corresponding JP Application No. 2013-085485, 8 pages in English and Japanese.

* cited by examiner

*Primary Examiner* — Martin Mushambo
(74) *Attorney, Agent, or Firm* — Sughrue Mion, PLLC

(57) ABSTRACT

A data editing apparatus includes a data editing portion for editing grid data in order to generate imposition data, and a fold data editing indicating portion that instructs the data editing portion to edit fold data. In the case that the data editing portion is instructed to edit the fold data by the fold data editing indicating portion, the data editing portion adds the fold data to the imposition data.

8 Claims, 20 Drawing Sheets

SHEET FEEDING DIRECTION ←

SHEET FEEDING DIRECTION ←

DATA EDITING APPARATUS, DATA EDITING METHOD, AND NON-TRANSITORY RECORDING MEDIUM STORING PROGRAM

CROSS-REFERENCE TO RELATED APPLICATION

This application is based upon and claims the benefit of priority from Japanese Patent Application No. 2013-085485 filed on Apr. 16, 2013, the contents of which are incorporated herein by reference.

BACKGROUND OF THE INVENTION

1. Field of the Invention

The present invention relates to a data editing apparatus and a data editing method for editing imposition data to be laid out on at least one printed product having a plurality of pages. The present invention further relates to a non-transitory recording medium that stores a program for enabling a computer to function as a unit for editing such imposition data.

2. Description of the Related Art

Recently, CTP (Computer To Plate) technology for directly producing printing plates from electronic data, without the need for generation of any intermediate products, has been in widespread use in the printing field. One process for generating such electronic data includes a process for generating imposition data, which are used to lay out a plurality of pages on a printer's sheet.

Imposition data include grid data, which define a vertical direction and page numbers of pages to be imposed on a sheet, and fold data, which define positions of fold lines where a printed sheet is to be folded into a signature, directions in which a printed sheet is to be folded, and a sequence of folds to be made. Japanese Patent No. 2898525 discloses a technology for imposing pages using grid data. Japanese Laid-Open Patent Publications Nos. 06-208219, 2011-017938, and 2011-070449 disclose technologies for imposing pages using fold data.

SUMMARY OF THE INVENTION

After multiple pages have been printed on a sheet based on generated imposition data, the printed sheet is folded into a signature by a folding machine in a subsequent process. On the condition that the pages have been imposed using fold data, then the folding machine folds the printed sheet along the fold lines to produce a signature, based on the positions of the fold lines, the folding directions, and the folding sequence, which are included in the fold data.

On the condition that the pages have been laid out using grid data, then it is impossible for the folding machine to fold the printed sheet into a signature, because the positions of the fold lines, the folding directions, and the folding sequence are not included in the grid data.

Heretofore, it has been customary to impose pages on a printer's sheet using either one of grid data or fold data. Thus, it has not been possible for a folding machine to fold a printed sheet in which pages are laid out thereon based on grid data.

It is an object of the present invention to provide a data editing apparatus, a data editing method, and a non-transitory recording medium that stores a program for allowing a folding machine to fold a printed sheet in which pages are laid out thereon based on grid data.

Another object of the present invention is to provide a data editing apparatus and a data editing method for editing imposition data to be laid out on at least one printed product having a plurality of pages, and a program for enabling a computer to function as a unit for editing such imposition data.

To achieve the above objects, there is provided in accordance with the present invention a data editing apparatus for editing imposition data to be imposed on at least one print product having a plurality of pages, comprising a data editing portion for editing grid data, which define page numbers and vertical directions of the pages in order to generate imposition data, and a fold data editing indicating portion for instructing to edit fold data, which define positions of fold lines, folding directions, and a folding sequence by which the print product is folded into a signature, wherein, in a case that the data editing portion is instructed to edit the fold data by the fold data editing indicating portion, the data editing portion adds the fold data to the imposition data.

According to the present invention, there also is provided a data editing method for editing imposition data to be imposed on at least one print product having a plurality of pages, comprising the steps of editing, by a data editing portion, grid data, which define page numbers and vertical directions of the pages in order to generate imposition data, as a first step, instructing, by a fold data editing indicating portion, the data editing portion to edit fold data, which define positions of fold lines, folding directions, and a folding sequence by which the print product is folded into a signature, as a second step, and instructing, by the fold data editing indicating portion, the data editing portion to add the fold data to the imposition data, as a third step.

According to the present invention, there further is provided a non-transitory recording medium storing a program for enabling a computer to function as a unit for editing imposition data to be imposed on at least one print product having a plurality of pages, the program enabling the computer to function as a data editing portion for editing grid data, which define page numbers and vertical directions of the pages in order to generate imposition data, and a fold data editing indicating portion for instructing to edit fold data, which define positions of fold lines, folding directions, and a folding sequence by which the print product is folded into a signature, wherein, in a case that the data editing portion is instructed to edit the fold data by the fold data editing indicating portion, the data editing portion adds the fold data to the imposition data.

According to the present invention, on the condition that the fold data editing indicating portion instructs the data editing portion to edit the fold data, the data editing portion adds the fold data to the imposition data in the form of grid data. Consequently, according to the fold data added to the imposition data, a folding machine can fold a print product with the added imposition data imposed thereon into a signature.

According to the present invention, therefore, simply by adding fold data to imposition data in the form of grid data, a print product with grid data imposed thereon can be folded into a signature by the folding machine. The added fold data are used in order to send information concerning fold lines, etc., to the folding machine to thereby allow the folding machine to fold a print product properly into a signature.

The data editing apparatus may further comprise a fold data entering portion for receiving the fold data entered from an external source. In the case that the data editing portion is instructed to edit the fold data by the fold data editing indicating portion, the data editing portion adds the fold data, which is received by the fold data entering portion, to the imposition data. Since the fold data are added to the imposition data as instructed by the user, the imposition data can be imposed easily.

The data editing apparatus may further comprise a storage portion for storing the imposition data. The data editing portion generates first imposition data by imposing the grid data on a hypothetical print product simulating the print product, and stores the first imposition data in the storage portion. In the case that the data editing portion is instructed to edit the fold data by the fold data editing indicating portion, the data editing portion reads out the first imposition data from the storage portion, and adds the fold data to the first imposition data that is read out from the storage portion, thereby generating second imposition data in which the grid data and the fold data are imposed on the hypothetical print product. In this manner, the data editing portion can generate second imposition data for imposing grid data and fold data on the hypothetical print product.

The data editing apparatus may further comprise a display portion for displaying the hypothetical print product. The display portion initially displays a process of generating the first imposition data that is carried out by the data editing portion. Next, in the case that the data editing portion is instructed to edit the fold data by the fold data editing indicating portion, the display portion switches to displaying the hypothetical print product with no data imposed thereon. Thereafter, the display portion displays, in succession, imposition of the fold data on the hypothetical print product, and imposition of the grid data of the first imposition data on the hypothetical print product with the fold data imposed thereon, thereby displaying a process of generating the second imposition data.

As described above, generation of the first imposition data, the hypothetical print product with no data imposed thereon, imposition of fold data on the hypothetical print product, and imposition of grid data on the hypothetical print product are successively displayed on the display portion. Therefore, it is easy and convenient for the user to carry out the imposition process.

The data editing apparatus may further comprise a rotation indicating portion for indicating a rotation of a top page of the hypothetical print product, which corresponds to a top page of a final product obtained by performing a subsequent process on the print product, the subsequent process including the formation of the signature, on a condition that the hypothetical print product with the second imposition data imposed thereon is displayed on the display portion, and a rotation processing portion for rotating other pages of the hypothetical print product in unison with the rotation of the top page of the hypothetical print product.

In a case that the rotation processing portion has rotated the other pages of the hypothetical print product, the display portion may display the hypothetical print product in which the pages thereof have been rotated, rather than the hypothetical print product in which the pages thereof have not been rotated.

In the case that the user gives instructions to rotate the vertical direction of only the top page, the vertical directions of the other pages are also rotated in unison together with the top page. Consequently, the imposition process can be carried out as desired by the user.

The rotation indicating portion may indicate to the rotation processing portion a rotational angle of the top page of the hypothetical print product, and in a case that a plurality of pages are formed in the hypothetical print product, the rotation processing portion may rotate the other pages through a predetermined angle depending on the rotational angle, based on the position and rotational angle of the top page of the hypothetical print product, and the positions of the other pages of the hypothetical print product.

Consequently, the other pages can be rotated accurately and efficiently.

The data editing apparatus may further comprise a back position designating portion for designating one of four sides of a top page of the hypothetical print product, as the position of a back of the final product, on a condition that the hypothetical print product with the second imposition data imposed thereon is displayed on the display portion, and a vertical direction determining portion for determining vertical directions of all of the pages of the hypothetical print product depending on the position of the back designated by the back position designating portion, and changing the present vertical positions of all of the pages to the determined vertical positions. In a case that the present vertical positions of all of the pages are changed to the determined vertical positions by the vertical direction determining portion, the display portion may display the hypothetical print product in which vertical directions of the pages are changed, rather than the hypothetical print product in which vertical directions of the pages are not changed.

On the condition that the user indicates a desired side as the position of the back, the vertical directions of all of the pages are automatically changed depending on the indicated position of the back. Therefore, the user finds it easy and convenient to carry out the imposition process.

The data editing apparatus may further comprise a back position determining portion for determining one of four sides of a top page of the hypothetical print product, based on grain information representing a grain direction of the print product, as the position of a back of the final product, on a condition that the hypothetical print product with the second imposition data imposed thereon is displayed on the display portion, and a vertical direction determining portion for determining vertical directions of all of the pages of the hypothetical print product depending on the position of the back determined by the back position determining portion, and for changing the present vertical positions of all of the pages to the determined vertical positions. In a case that the present vertical positions of all of the pages are changed to the determined vertical positions by the vertical direction determining portion, the display portion may display the hypothetical print product in which vertical directions of the pages are changed, rather than the hypothetical print product in which vertical directions of the pages are not changed.

On the condition that the grain direction and the vertical directions are not in agreement with each other, then even on the condition that the back is bonded to signatures in order to produce a final product such as a book in a subsequent process, the back may not stick snugly at the time of bonding, or the book may not be opened easily.

The above problems can be solved by determining the position of the back based on the grain direction, and changing the vertical directions of all of the pages based on the determined position of the back.

More specifically, in the case that the position of a fold line to be finally folded to produce the signature is preset as the position of the back of the final product, on a condition that the direction of the fold line to be finally folded agrees with the grain direction, the back position determining portion maintains the position of the back, and the vertical direction determining portion does not change the vertical directions of all of the pages.

On the other hand, on a condition that the direction of the fold line to be finally folded does not agree with the grain direction, the back position determining portion sets the position of the fold line to be finally folded as the position of a folded edge of the final product, and determines a new position of the back based on the position of the folded edge. The vertical direction determining portion determines vertical directions of all of the pages based on the position of the folded edge and the new position of the back, and changes the present vertical positions of all of the pages to the determined vertical positions.

Consequently, the position of the back is automatically changed, so as to bring the direction of the back into agreement with the grain direction, and the vertical directions of all of the pages are automatically changed depending on the changed position of the back.

According to the present invention, as described above, simply by adding fold data to imposition data in the form of grid data, a print product with grid data imposed thereon can be folded into a signature by a folding machine.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Data editing apparatus according to preferred embodiments, in relation to data editing methods and programs that are carried out by the data editing apparatus, will be described in detail below with reference to the accompanying drawings.

[Configuration of Data Editing Apparatus]

Figure 1:
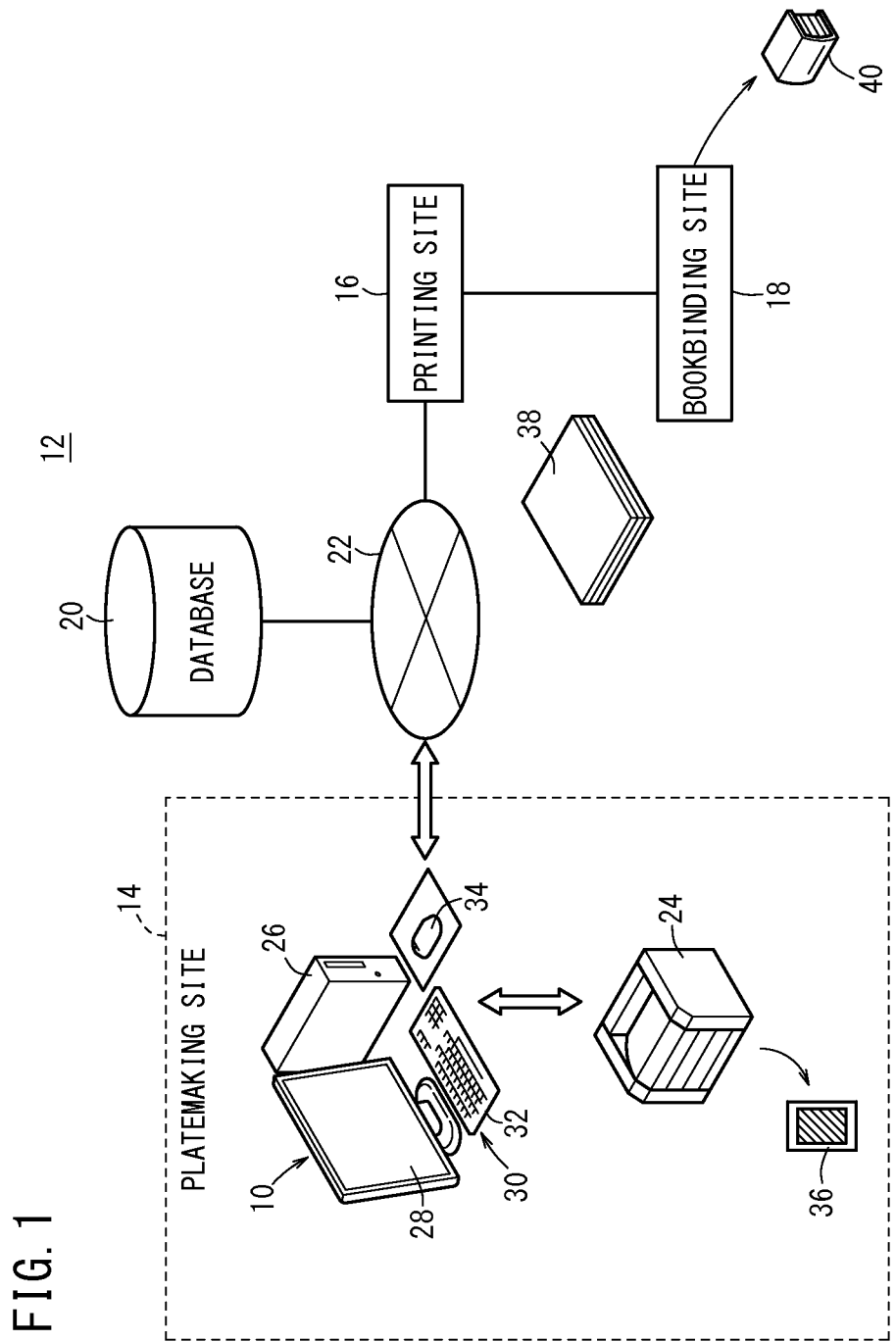
FIG. 1 is a schematic view of a printing system incorporating a data editing apparatus according to an embodiment of the present invention.

FIG. 1 schematically shows a printing system 12 incorporating a data editing apparatus 10 according to an embodiment of the present invention. As shown in FIG. 1, the printing system 12 includes, in addition to the data editing apparatus 10, a platemaking site 14, a printing site 16, a bookbinding site 18, a database server 20, and a LAN 22. The platemaking site 14 includes the data editing apparatus 10 and a proof press 24.

The data editing apparatus 10 generates page-specific edit data (page description data) expressed in a page description language (hereinafter referred to as "PDL"), e.g., PDL data in color channels representing four colors (C, M, Y, K) or three colors (R, G, B).

PDL refers to a language for describing image information including format information, position information, and color information (including density information) of characters, graphics, etc., in a "page", which serves as an output unit for printing, displaying, etc. Page description languages include, for example, PDF which stands for "Portable Document Format" and is prescribed according to ISO32000-1: 2008, PostScript (registered trademark) of Adobe Systems, and XPS (XML Paper Specification).

The data editing apparatus 10 performs a desired image processing routine such as a preflight process, a color conversion process, or a layout process on page-specific edit data, converts the processed page-specific edit data into raster-format data such as bitmap data or TIFF data, and sends the converted raster-format data as printing data to the proof press 24.

The data editing apparatus 10 includes a main portion 26, a display portion 28, and an input portion 30 including a keyboard 32 and a mouse 34. The mouse 34, which serves as a pointing device, may be replaced with a track pad or a track ball.

The proof press 24 is an output device for printing a proof 36 to be proofread. The proof press 24 may comprise a DDCP (Direct Digital Color Proofer), which is equivalent to an offset press in terms of printing capabilities, an ink jet color proofer, a low-resolution color laser printer (electrophotographic printer), an ink jet printer, or the like.

The database server 20 serves to save, update, and delete various data files required to produce a final print product 40 (final product). The various data files include material data files (content data files) from a production company, not shown, proof data files, platemaking data files, job ticket files, e.g. JDF (Job Definition Format) files, ICC (International Color Consortium) profiles, color sample data files, etc.

The LAN 22 is constructed according to communication standards such as Ethernet (registered trademark) or the like. The platemaking site 14, the printing site 16, and the database server 20 are interconnected via the LAN 22. For example, on the condition that the platemaking site 14 and the printing site 16 are geographically spaced remotely from each other, then printing plate data are exchanged between the platemaking site 14 and the printing site 16 via the LAN 22.

The printing site 16 includes an image processing portion for performing desired image processing routines on printing plate data, a plate setter for producing printing plates, and an offset press for printing desired images on various mediums to produce prints, i.e., a plurality of jobs 38. The platesetter and the offset press may be replaced with a digital press, which is capable of producing prints directly from printing plate data.

The bookbinding site 18 includes various devices for performing production processes including a surface treatment process, a sheet folding process, a collating process, a binding process, a cutting process, a casemaking process, etc. (subsequent processes), on a plurality of jobs 38 supplied from the printing site 16. In a case where the production processes are successively performed on the jobs 38, the final print product 40, e.g., a casebound book as shown in the drawings, is produced.

Figure 2:
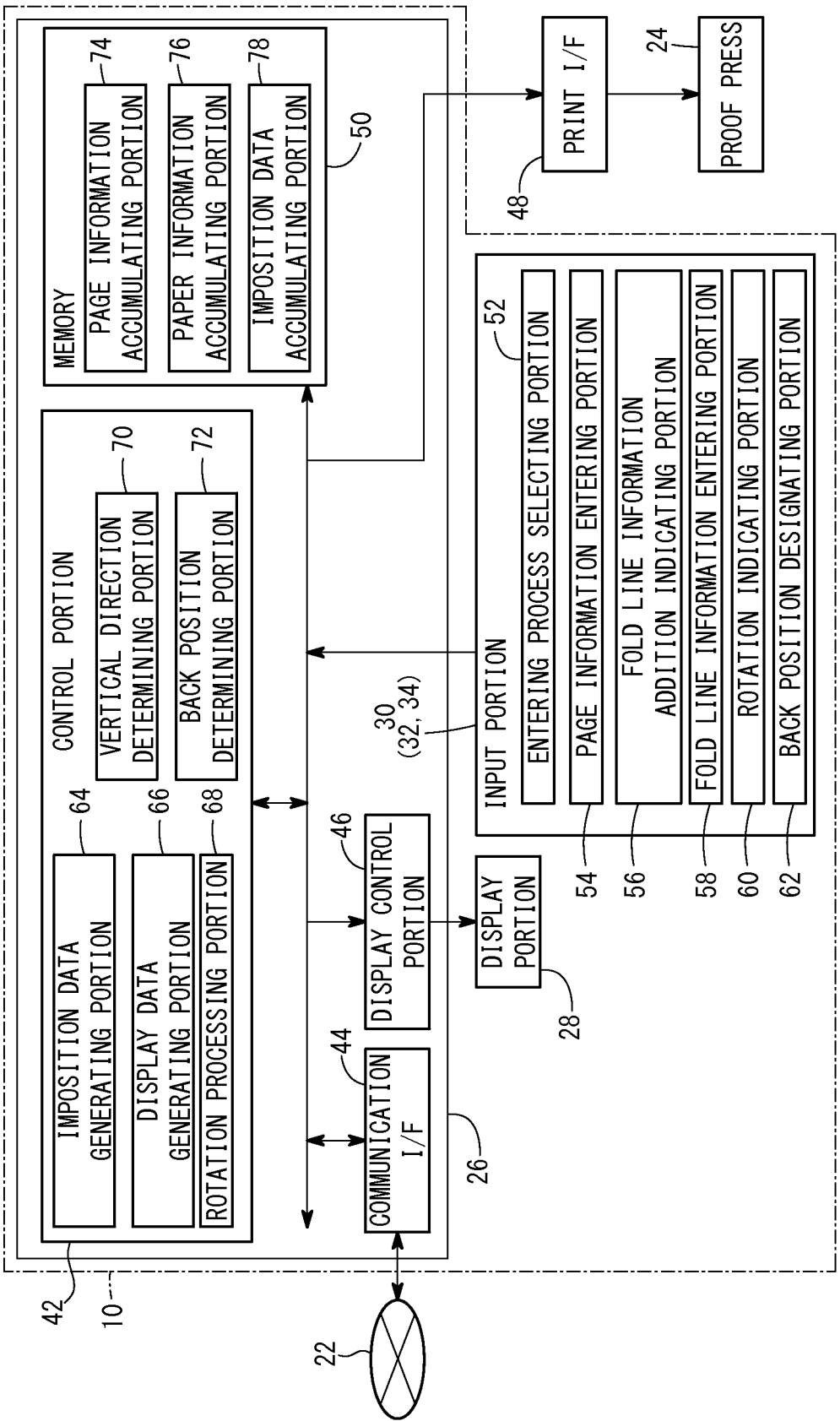
FIG. 2 is a functional block diagram of the data editing apparatus shown in FIG. 1.

FIG. 2 shows in functional block form the data editing apparatus 10 shown in FIG. 1. As shown in FIG. 2, the main portion 26 includes a control portion 42, a communication I/F 44, a display control portion 46, a print I/F 48, and a memory 50.

The communication I/F 44 serves as an interface for sending electric signals to and receiving electric signals from external apparatus. For example, the communication I/F 44 can acquire various material data provided by a non-illustrated production company. The communication I/F 44 can also acquire items of information such as printing plate data, ICC profiles, etc., which are managed and saved in the database server 20.

The display control portion 46 comprises a control circuit for controlling the display portion 28 under the control of the control portion 42. More specifically, in a case where the display control portion 46 supplies a display control signal to the display portion 28 via a non-illustrated I/F, the display portion 28 is energized and is made capable of displaying various images.

The print I/F 48 serves as an interface for sending electric signals representing printing data to the proof press 24. Based on electric signals sent from the print I/F 48, the proof press 24 prints a desired proof 36.

In order to implement the functions of the keyboard 32 and the mouse 34, the input portion 30 has an entering process selecting portion 52, a page information entering portion 54, a fold line information addition indicating portion 56, a fold line information entering portion 58 (fold data entering portion), a rotation indicating portion 60, and a back position designating portion 62. On the condition that the user of the data editing apparatus 10 operates the input portion 30 in order to enter desired instructions, one of the above components of the input portion 30 receives the instructions and sends the instructions to the control portion 42.

The control portion 42 comprises a processing portion such as a CPU (Central Processing Unit) or the like. By reading out and executing programs stored in the memory 50, which serves as a non-transitory recording medium, the control portion 42 performs various functions, including the functions of an imposition data generating portion 64 (data editing portion), a display data generating portion 66, a rotation processing portion 68, a vertical direction determining portion 70, and a back position determining portion 72, of the data editing apparatus 10.

The imposition data generating portion 64 generates imposition data for imposing pages on jobs 38. More specifically, the imposition data generating portion 64 generates page-specific edit data from material data representing characters, graphics, patterns, photos, etc. The imposition data generating portion 64 also generates imposition data, e.g., job tickets, for imposing pages onto sheets of a given size (hypothetical print products), according to an indicated binding method and an indicated sheet folding method.

Hereinafter, the term "hypothetical print product" will be used to imply a hypothetical print product simulating a job 38, as well as a hypothetical print product simulating a signature or a final print product 40.

The imposition data include grid data and fold data. The grid data define positions of pages imposed on a job 38, page numbers of the pages, and orientations of the pages. The fold data define positions of fold lines where a job 38 is to be folded into a signature, directions in which the job 38 is to be folded, and a sequence of folds to be made at the bookbinding site 18.

According to the present embodiment, in order to produce signatures and obtain a final print product 40 at the bookbinding site 18, even on the condition that the final print product 40 is a job 38 with pages imposed thereon based on grid data, the data editing apparatus 10 includes the following features.

Before the imposition data generating portion 64 generates imposition data, in the case that the user operates the input portion 30 to indicate the generation of grid data or fold data, the entering process selecting portion 52 receives the entered instructions and supplies the received instructions to the imposition data generating portion 64. More specifically, the entering process selecting portion 52 receives instructions representing any one of the processes selected by the user. Such processes include a page number entering process for entering the positions, orientations, and page numbers of pages to generate grid data, and a fold line entering process for entering the positions of fold lines, the directions in which a printed sheet is to be folded, and the sequence of folds that are made, in order to generate fold data.

On the condition that the imposition data generating portion 64 is instructed to generate grid data according to the page number entering process, then the page information entering portion 54 sends the positions, orientations, and page numbers of pages, which have been indicated by the user-operated input portion 30, to the imposition data generating portion 64. Based on the positions, orientations, and page numbers of pages that have been received, the imposition data generating portion 64 assigns pages and a vertical direction to a hypothetical print product simulating a job 38, and generates or edits imposition data in the form of grid data (first imposition data).

The memory 50 stores programs and data, which are required for the control portion 42 to control various components. The memory 50 includes a page information accumulating portion 74 (storage unit), a paper information accumulating portion 76, and an imposition data accumulating portion 78. The imposition data generating portion 64 temporarily stores imposition data in the form of edited grid data in the page information accumulating portion 74.

In a case where the user operates the input portion 30 to indicate the addition of fold data for the imposition data, the fold line information addition indicating portion 56 receives the entered instructions, and then supplies the received instructions to the imposition data generating portion 64. Based on the received instructions, the imposition data generating portion 64 reads out the imposition data, which are accumulated temporarily in the page information accumulating portion 74.

On the condition that the fold line information addition indicating portion 56 is instructed to add fold data, then the fold line information entering portion 58 supplies fold line information (positions of fold lines, folding directions, and a folding sequence), which have been indicated by the input portion 30 operated by the user, to the imposition data generating portion 64. The imposition data generating portion 64 adds the supplied fold line information to the read imposition data. As a result, the imposition data generating portion 64 edits and generates new imposition data (second imposition data), which represent both grid data and fold data imposed on a hypothetical print product. The imposition data generating portion 64 then accumulates the edited new imposition data in the imposition data accumulating portion 78.

During the editing process (generating process), which is carried out on the imposition data by the imposition data generating portion 64, the display data generating portion 66 is supplied with data including a hypothetical print product from the imposition data generating portion 64. Each time that the display data generating portion 66 is supplied with such data, the display data generating portion 66 performs a RIP (Raster Image Processing) routine on the supplied data, so as to convert the data into raster-format data. For example, on the condition that the display data generating portion 66 is supplied with data, which is representative of a hypothetical print product with imposition data imposed thereon, the display data generating portion 66 lays out page-specific edited data in a predetermined data area, adds mark information representing registration marks, etc., and rasterizes the overall data into raster-format data. The display data generating portion 66 sends the raster-format data to the display control portion 46, which supplies a display control signal based on the raster-format data to the display portion 28. The display portion 28 displays the hypothetical print product on the display screen thereof.

According to the JDF specification, on the condition that jobs 38 are folded into signatures, and a casebound book made up of the signatures is produced as a final print product 40, then the positions of fold lines at which the jobs 38 are finally folded must appear on the back of the casebound book.

However, there is a requirement for the user to change the position of the back of the book to a desired position. Moreover, as described later, on the condition that the direction of the grain (grain direction) of the sheets of the jobs 38 and the final print product 40 (casebound book) is not aligned with the position of the back (direction of the back) of the book, then in a subsequent process, in a case where the back is bonded to the signatures in order to produce the casebound book, the back may not stick snugly upon being bonded, or it may be difficult for the casebound book to be opened.

To solve the above problems, the data editing apparatus 10 according to the present embodiment includes the following functions.

More specifically, in the case that a hypothetical print product with grid data and fold data imposed thereon is displayed on the screen of the display portion 28, the user can operate the input portion 30 in order to indicate a change in the vertical direction of each page. In this case, the rotation indicating portion 60 supplies a user-indicated angle through which the vertical direction is to be rotated, i.e., a changed vertical direction, to the control portion 42.

Based on the supplied instructions, the rotation processing portion 68 of the control portion 42 reads out the imposition data from the imposition data accumulating portion 78. Based on the read imposition data, the rotation processing portion 68 rotates the vertical directions of all of the pages assigned to the hypothetical print product through a given angle based on the angle indicated by the rotation indicating portion 60. Then, the rotation processing portion 68 supplies the rotated imposition data to the imposition data generating portion 64.

The imposition data generating portion 64 accumulates the rotated imposition data in the imposition data accumulating portion 78, and outputs the rotated imposition data to the display data generating portion 66, which generates raster-format data from the rotated imposition data. The display data generating portion 66 supplies the raster-format data to the display control portion 46, which supplies a display control signal based on the raster-format data to the display portion 28. At this time, the display portion 28 displays imposition data, in which the vertical directions of all of the pages have been rotated as instructed by the user, on the screen of the display portion 28.

On the condition that a hypothetical print product with grid data and fold data imposed thereon is displayed on the screen of the display portion 28, the user can further operate the input portion 30 in order to indicate a change in the position of the back of the hypothetical print product (casebound book). In the case that the user indicates a change in the position of the back of the hypothetical print product, the back position designating portion 62 supplies the changed position of the back, which was indicated by the user, to the control portion 42.

Based on the supplied instructions, the back position determining portion 72 of the control portion 42 reads out the imposition data from the imposition data accumulating portion 78. The back position determining portion 72 determines the position of the back, which is supplied from the back position designating portion 62, as a new position of the back of the hypothetical print product.

The vertical direction determining portion 70 identifies vertical positions of all of the pages assigned to the hypothetical print product based on the new position of the back determined by the back position determining portion 72. More specifically, on the condition that the user provides instructions to change the position of the back, the vertical direction determining portion 70 changes the vertical positions of all of the pages to vertical directions that correspond to the new position of the back. The vertical direction determining portion 70 supplies the changed imposition data to the imposition data generating portion 64.

The imposition data generating portion 64 accumulates the changed imposition data in the imposition data accumulating portion 78, and outputs the changed imposition data to the display data generating portion 66, which generates raster-format data based on the changed imposition data. The display data generating portion 66 supplies the raster-format data to the display control portion 46, which supplies a display control signal based on the raster-format data to the display portion 28. At this time, the display portion 28 displays imposition data, with the position of the back changed as instructed by the user and the vertical directions of all of the pages rotated as instructed by the user, on the screen of the display portion 28.

The paper information accumulating portion 76 accumulates information concerning sheets of paper (paper information), which can be printed into jobs 38 and a final print product 40. More specifically, such paper information includes the type, size, and grain direction (grain information) of the sheets of paper of the jobs 38.

The back position determining portion 72 reads out the imposition data accumulated in the imposition data accumulating portion 78, and judges whether or not the grain direction and the position of the back (the direction of the back) included within the read imposition data are in agreement with each other. On the condition that the direction of the back and the grain direction are not in agreement with each other, the back position determining portion 72 sets the position of a fold line, where the sheet is to be finally folded, as the position of a folded edge. In addition, based on the position of the folded edge, the back position determining portion 72 determines the position of a fold line, which is in agreement with the grain direction, as the position of the fold line where the sheet is to be finally folded (new position of the back).

Based on the position of the folded edge and the new position of the back that are determined by the back position determining portion 72, the vertical direction determining portion 70 determines new vertical directions of all of the pages, and changes the present vertical directions of all of the pages to the determined new vertical directions. The vertical direction determining portion 70 supplies the changed imposition data to the imposition data generating portion 64. The imposition data generating portion 64 accumulates the changed imposition data in the imposition data accumulating portion 78, and outputs the changed imposition data to the display data generating portion 66, which generates raster-format data from the changed imposition data. The display data generating portion 66 supplies the raster-format data to the display control portion 46, which in turn supplies a display control signal based on the raster-format data to the display portion 28. At this time, the display portion 28 displays imposition data, in which the back direction is aligned with the grain direction, on the screen of the display portion 28.

On the condition that the direction of the back and the grain direction are in agreement with each other, the above process of changing the vertical directions is not carried out.

[Basic Operation Sequence of Data Editing Apparatus]

The data editing apparatus 10 according to the present embodiment basically is configured as described above. Operations of the data editing apparatus 10, i.e., a data editing method according to the present invention, will be described below with reference to FIGS. 3 through 7, as well as FIGS. 1 and 2 in case of necessary.

After imposition data to be imposed on a hypothetical print product have been edited based on grid data in an editing process, it is assumed that fold data are added to the imposition data in order to generate new imposition data. It also is assumed that the imposition data to be generated includes two pages, which are assigned to each of the front and reverse sides of a single sheet from which a hypothetical print product is to be made. In other words, the imposition data to be generated includes a total of four pages, which are assigned to the single sheet.

Figure 3:
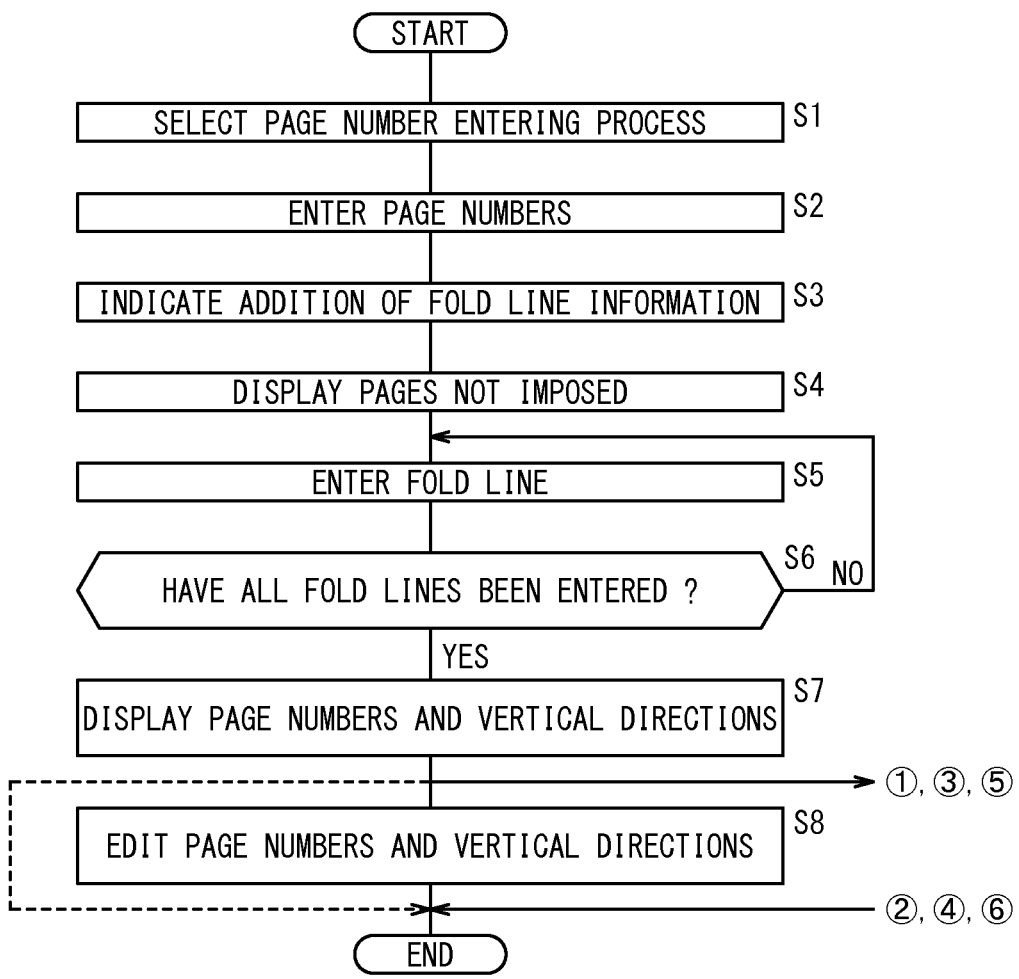
FIG. 3 is a flowchart of an imposition sequence.
Figure 4:
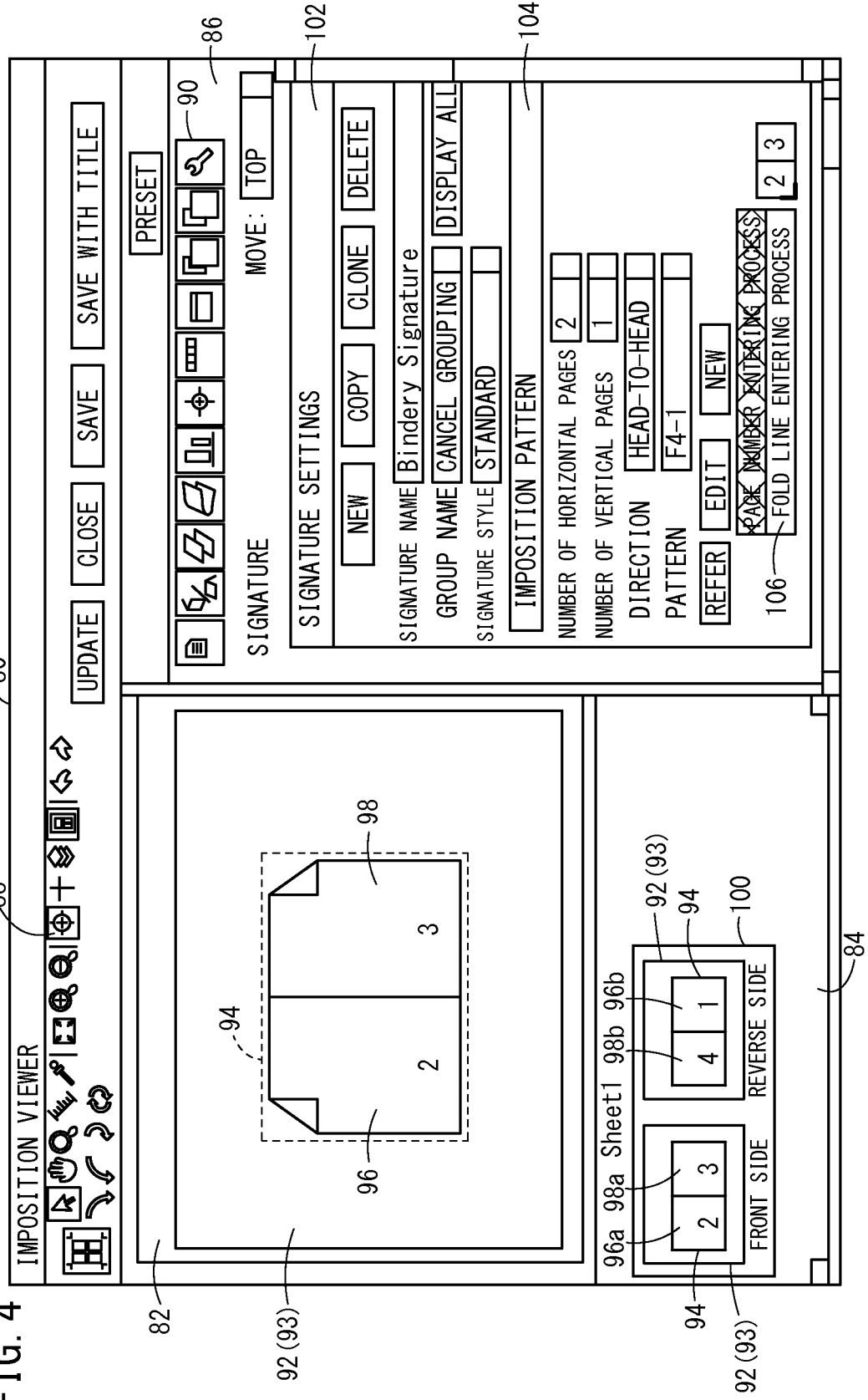
FIG. 4 is a view showing a display screen for selecting a page number entering process for entering grid data.

In step S1 of FIG. 3, the user operates the input portion 30 while observing the display screen 80, shown in FIG. 4, of the display portion 28 (see FIGS. 1 and 2), and selects the page number entering process. The entering process selecting portion 52 receives the selected page number entering process as instructions from the user, and supplies the received instructions to the control portion 42. Based on the entered instructions, the imposition data generating portion 64 of the control portion 42 is made capable of generating grid data according to the page number entering process.

More specifically, the display screen 80 shown in FIG. 4 is made up of upper and lower display areas 82, 84 on a left side thereof, a display area 86 on a right side thereof, and icon groups 88, 90.

The display area 82 displays a sheet 93 for a hypothetical print product 92. The sheet 93 includes an area 94 having two left and right pages 96, 98 assigned thereto. Each of the pages 96, 98 in the area 94 are accompanied by numbers 2, 3, respectively, which indicate that the left page 96 is a second page and the right page 98 is a third page.

The display area 84 includes an area 100 in which both front and reverse sides of a single sheet 93 of the hypothetical print product 92 are displayed. Two pages 96a, 98a (second and third pages) are assigned to the front side of the sheet 93, whereas two pages 96b, 98b (first and fourth pages) are assigned to the reverse side of the sheet 93.

Pages that are assigned to the front side of the sheet 93 (hypothetical print product 92) are denoted by reference numerals with the suffix "a" appended thereto, and pages that are assigned to the reverse side of the sheet 93 are denoted by reference numerals with the suffix "b" appended thereto. On the reverse side of the page 96a, which is the second page, the page 96b is placed, which is the first page. Similarly, the page 98b, which is the fourth page, is placed on the reverse side of the page 98a, which is the third page.

The display area 86 displays the icon group 90, a signature setting area 102 in which details are displayed indicative of signature settings to be made by the user, and an imposition pattern setting area 104 in which details are displayed indicative of imposition settings to be made by the user. Among the signature setting area 102 and the imposition pattern setting area 104, the imposition pattern setting area 104 displays an imposition process for the hypothetical print product 92 that is displayed in the display areas 82, 84, i.e., a widget 106 for selecting a process for generating imposition data.

On the condition that the user operates the mouse 34 in order to select an item "ENTER PAGE NUMBER" in the widget 106, the entering process selecting portion 52 receives instructions for the page number entering process. In FIG. 4, the selected item "ENTER PAGE NUMBER" is displayed in cross-hatching. The widget 106 also displays an item "ENTER FOLD LINE" for indicating the editing of imposition data based on the fold data. On the condition that the user operates the mouse 34 in order to select the item "ENTER FOLD LINE", the entering process selecting portion 52 receives instructions for the fold line entering process.

In step S1, the imposition data generating portion 64 supplies data required for the user to select the page number entering process in advance to the display data generating portion 66, thereby displaying the details shown in FIG. 4 on the display screen 80. More specifically, the display data generating portion 66 carries out the RIP process on the entered data, so as to convert the entered data into raster-format data, and the display control portion 46 supplies a display control signal based on the raster-format data to the display portion 28, which displays the details shown in FIG. 4 on the display screen 80.

Next, in step S2 (first step), in order to edit grid data according to the page number entering process, the imposition data generating portion 64 supplies data concerning editing of the grid data to the display data generating portion 66. The display data generating portion 66 generates raster-format data depending on the supplied data, and the display control portion 46 supplies a display control signal based on the raster-format data to the display portion 28, which displays an editing screen 110 shown in FIG. 5.

The editing screen 110 includes a display area 112 for entering page numbers. The display area 112 displays front and reverse sides of a single sheet 114 for the hypothetical print product 92. Two pages 116a, 118a are assigned to the front side of the sheet 114, whereas two pages 116b, 118b are assigned to the reverse side of the sheet 114.

The display area 112 also displays central textboxes respectively in the pages 116a, 116b, 118a, 118b. By operating the keyboard 32 and the mouse 34, the user can enter page numbers in the textboxes, which are displayed in desired ones of the pages 116a, 116b, 118a, 118b. The page information entering portion 54 receives the entered page numbers, and sends the received page numbers to the imposition data generating portion 64.

Through operation of the imposition data generating portion 64, the indicated page numbers are reflected in the imposition data. As a result, the imposition data generating portion 64 is capable of editing the imposition data in the form of grid data, in which the page numbers indicated by the user are assigned to given pages. The imposition data generating portion 64 temporarily accumulates the edited imposition data in the page information accumulating portion 74.

In addition, the imposition data generating portion 64 supplies the edited imposition data to the display data generating portion 66. The display data generating portion 66 generates raster-format data depending on the supplied imposition data, and the display control portion 46 supplies a display control signal based on the raster-format data to the display portion 28, which displays the imposition data.

Figure 5:
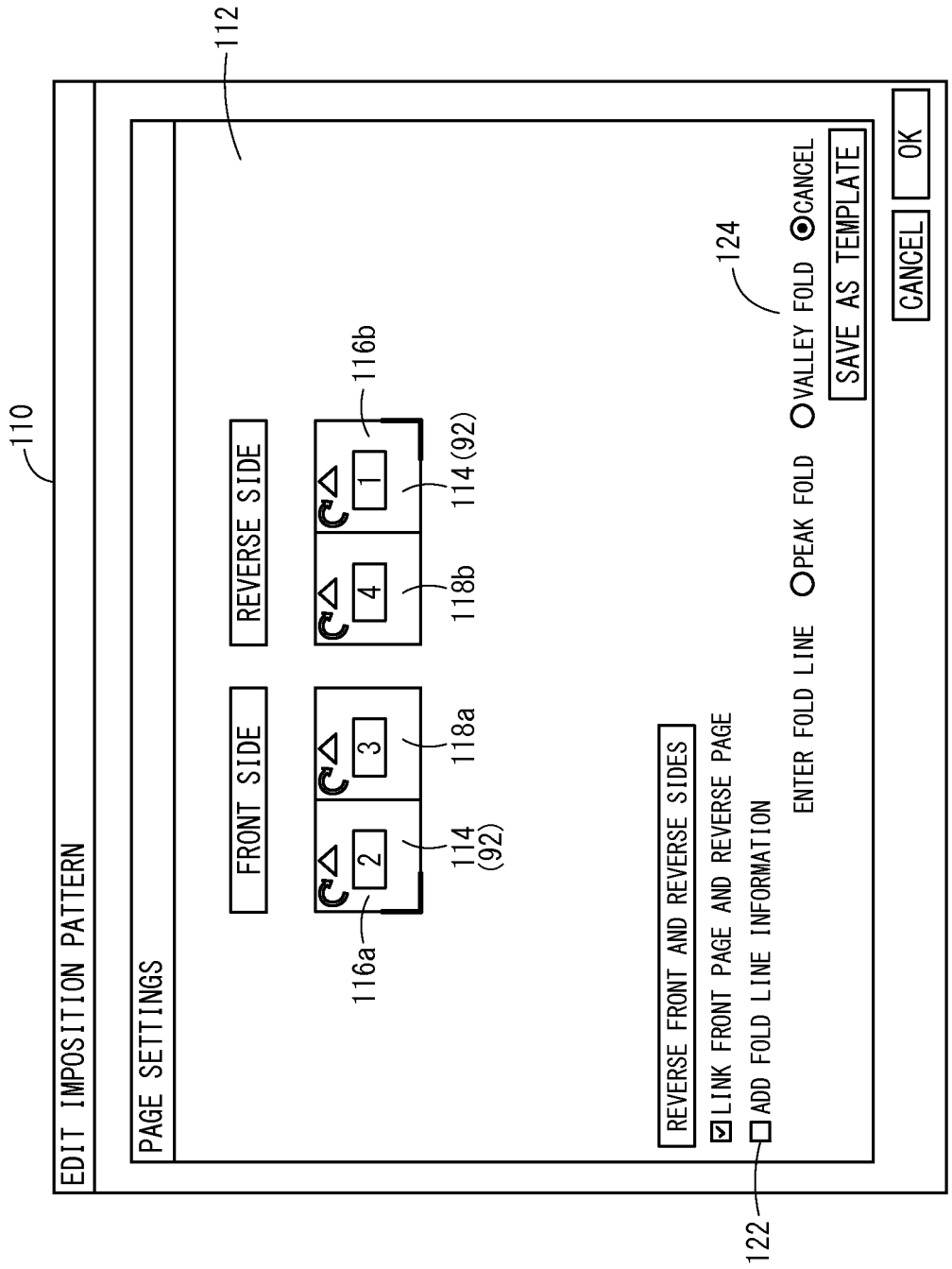
FIG. 5 is a view showing a display screen with entered grid data.

As shown in FIG. 5, in the display area 112, triangular arrows are displayed, which indicate vertical directions, respectively, in upper portions of the pages 116a, 116b, 118a, 118b. The arrows are pointed upwardly. Further, in the display area 112, rotation arrows also are displayed, which indicate that the vertical directions can be rotated or changed, in upper left corners of the respective pages 116a, 116b, 118a, 118b.

In the following step S3 (second step), the user operates the mouse 34 in order to check a checkbox 122 that is displayed in a lower portion of the display area 112. In this manner, the user can indicate the addition of fold line information to the imposition data, i.e., the addition of fold data.

The fold line information addition indicating portion 56 receives instructions for adding fold line information, and supplies the received instructions to the control portion 42. In accordance with the supplied instructions, the imposition data generating portion 64 supplies data of the sheet 114 for the hypothetical print product 92, in which data have not been imposed, to the display data generating portion 66. The display data generating portion 66 generates raster-format data depending on the supplied data, and the display control portion 46 supplies a display control signal based on the raster-format data to the display portion 28.

Figure 6:
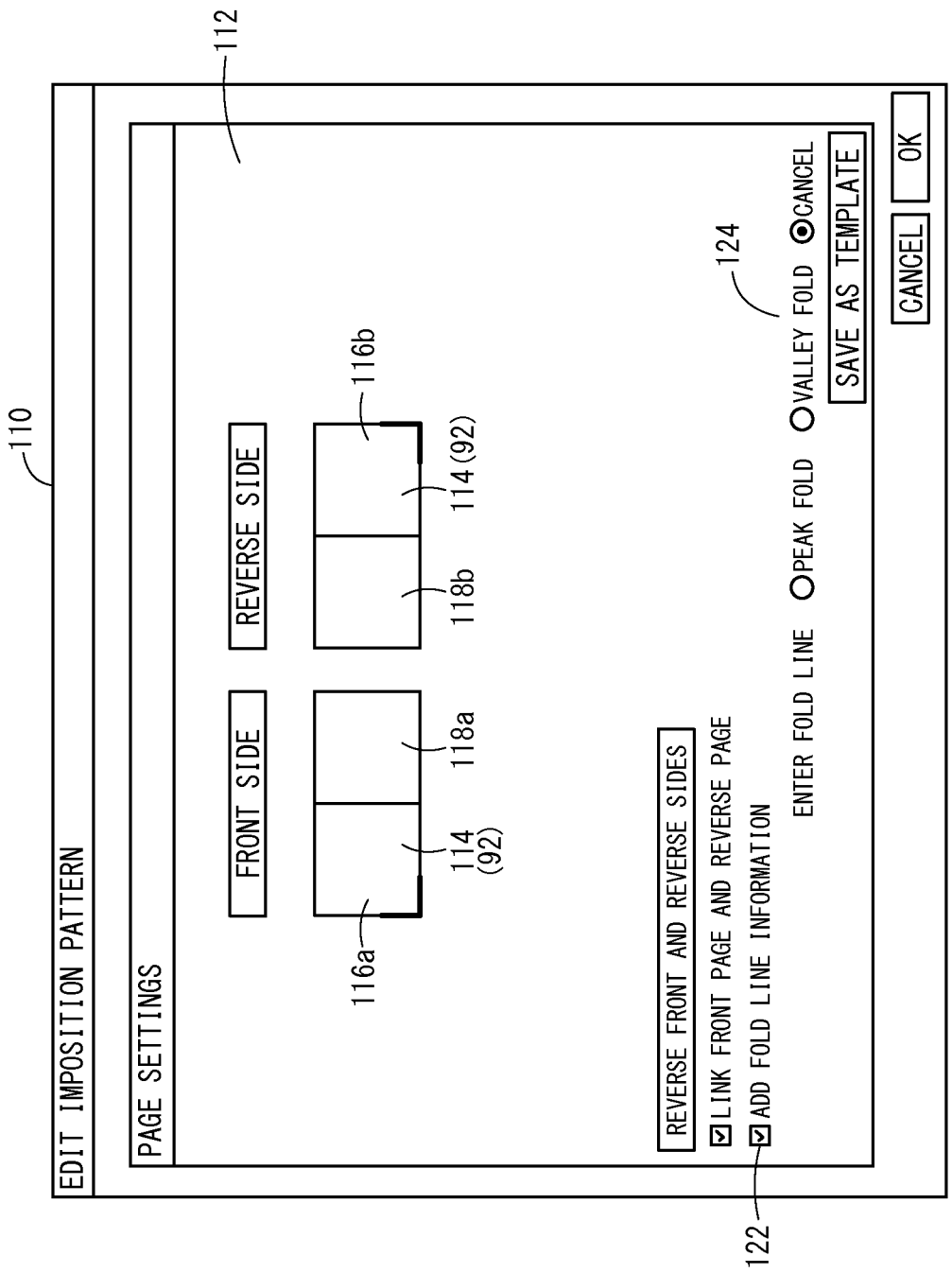
FIG. 6 is a view showing a display screen with instructions for adding fold line information.

Consequently, in step S4 (third step), the display portion 28 displays the pages 116a, 116b, 118a, 118b, in which data have not been imposed, in the display area 112 of the editing screen 110, as shown in FIG. 6. In FIG. 6, the checkbox 122 is shown as having been checked by the user operating the mouse 34. Thus, by operating the mouse 34, the user is capable of clicking a radio button group 124 for selecting a folding direction.

In response to the instructions for adding fold line information, the imposition data generating portion 64 reads out the imposition data in the form of grid data, i.e., the data representing the imposed state shown in FIG. 5, which have been temporarily accumulated in the page information accumulating portion 74.

In step S5, the user operates the mouse 34 in order to select, as a folding direction from the radio button group 124, a radio button indicating a peak fold. The user then clicks on a line, which separates the two pages 116a, 118a from each other, i.e., a central line that divides the front side of the sheet 114 into the two pages 116a, 118a. Accordingly, the control portion 42 is instructed to use the central line as a fold line.

The fold line information entering portion 58 receives instructions representing the peak fold and the position of the fold line, and supplies the received instructions to the control portion 42. The imposition data generating portion 64 indicates the instructed line as a fold line to the sheet 114, in which data have not been imposed, and also adds information to the sheet 114 indicating that the sheet 114 is to be folded into a peak fold at the fold line. The imposition data generating portion 64 adds page numbers and the vertical directions included in the imposition data, which have been read out from the page information accumulating portion 74, as default values to the sheet 114. Further, the imposition data generating portion 64 edits the imposition data into new imposition data, to which fold data indicative of the fold line and the peak fold, as well as the grid data indicative of the page numbers and the vertical directions, have been added.

On the condition that all of the fold lines have not been entered (step S6: NO), then step S5 is repeated.

On the condition that all of the fold lines have been entered (step S6: YES), e.g., on the condition that the user operates the input portion 30 to thereby indicate that all of the fold lines have been entered, then the fold line information entering portion 58 receives the instructions from the user, and sends the received instructions to the control portion 42.

Based on the supplied instructions, the imposition data generating portion 64 accumulates the edited new imposition data in the imposition data accumulating portion 78, and supplies the new imposition data to the display data generating portion 66. The display data generating portion 66 generates raster-format data depending on the supplied new imposition data, and the display control portion 46 supplies a display control signal based on the raster-format data to the display portion 28.

Figure 7:
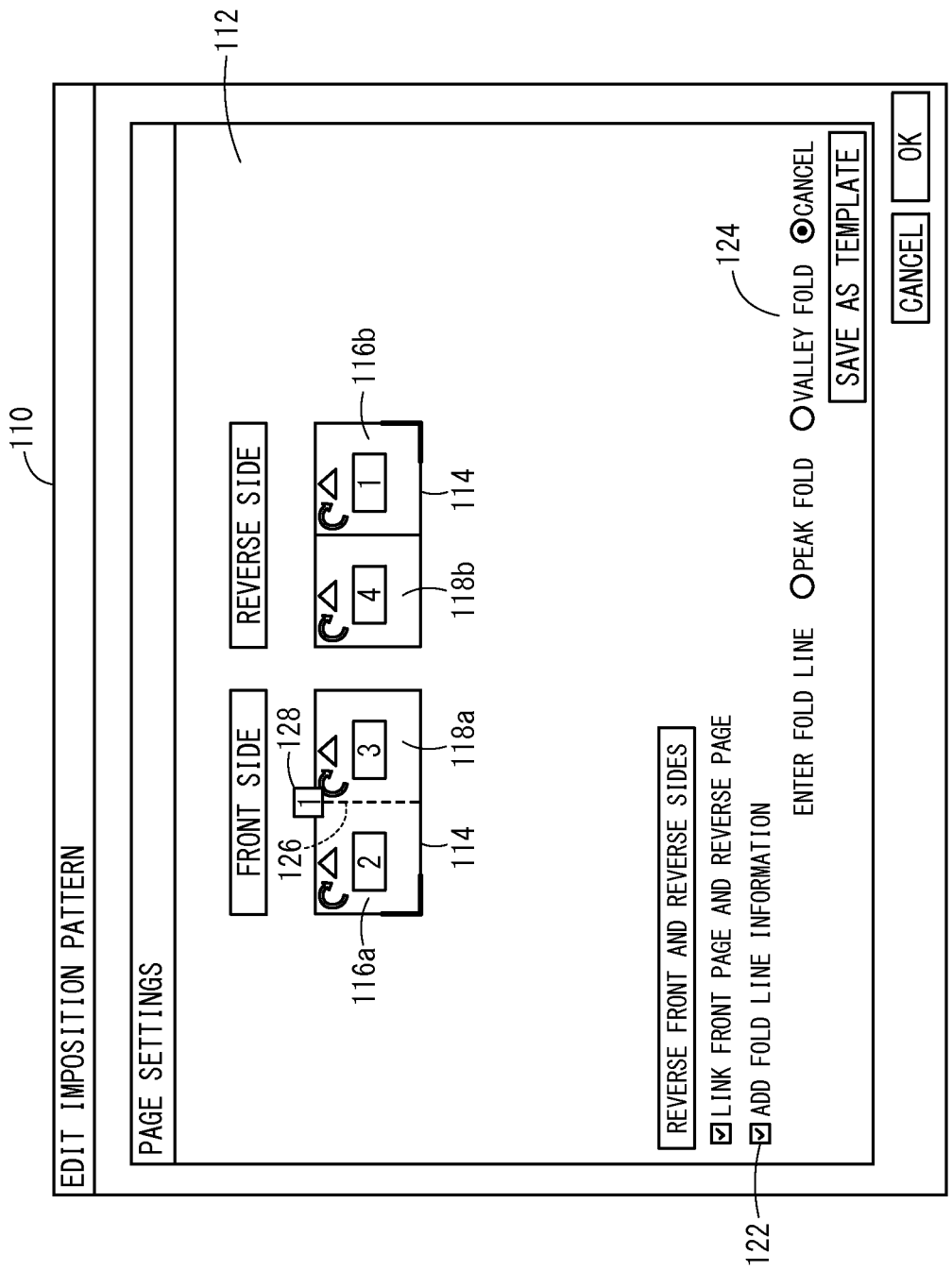
FIG. 7 is a view showing a display screen with added fold data.

At this time, as shown in FIG. 7, the display portion 28 displays the sheet 114 for the hypothetical print product 92, to which the grid data and the fold data have been imposed, in the display area 112 of the editing screen 110.

In FIG. 7, a fold line 126 is displayed as a broken line on the sheet 114, with the number "1" displayed in an area 128 indicative of a folding sequence, on the upper part of the fold line 126. The number "1", which is displayed in the area 128, indicates that the sheet 114 should be folded first along the fold line 126. In addition, a radio button indicative of a peak fold is selected in the radio button group 124.

By observing the displayed details in the display area 112, the user can confirm that the position of the fold line 126, the direction in which the sheet 114 is folded, and the folding sequence have been set properly as instructed by the user.

In step S8, while observing the displayed details on the editing screen 110, the user may operate the mouse 34, in case of necessary, in order to provide instructions for changing the page numbers and the vertical directions of desired ones of the pages 116a, 116b, 118a, 118b. On the condition that the user provides such instructions, then the fold line information entering portion 58 sends the entered instructions to the control portion 42, as with step S2. Based on the supplied instructions, the imposition data generating portion 64 reads out imposition data from the imposition data accumulating portion 78. Then, the imposition data generating portion 64 changes the read imposition data so as to represent the page numbers and the vertical directions of the indicated pages 116a, 116b, 118a, 118b.

The imposition data generating portion 64 accumulates the changed imposition data in the imposition data accumulating portion 78, and supplies the changed imposition data to the display data generating portion 66. The display data generating portion 66 generates raster-format data depending on the supplied changed imposition data, and the display control portion 46 supplies a display control signal based on the raster-format data to the display portion 28. At this time, the display portion 28 displays the sheet 114, including the changed imposition data for the hypothetical print product 92, in the display area 112 of the editing screen 110. Upon observing the displayed details on the editing screen 110, the user can confirm whether or not the page numbers and the vertical directions have been changed as instructed.

[Other Operation Sequences of Data Editing Apparatus]

Other operation sequences of the data editing apparatus 10 according to first through third modifications will be described below with reference to FIGS. 8 through 20.

The first through third modifications are concerned with an imposition data editing process, which is triggered by the user operating the mouse 34 in a case where the user observes the hypothetical print product 92 with the grid data and the fold data imposed thereon, as displayed on the editing screen 110 (step S7 in FIG. 3). The imposition data editing process according to the first through third modifications is performed instead of step S8 of FIG. 3.

As described above, according to the JDF Specification, on the condition that jobs 38 are folded into signatures, and a casebound book made up of the signatures is produced as a final print product 40, then the positions of fold lines at which the jobs 38 are finally folded must appear on the back of the casebound book. However, there is a requirement for the user to change the position of the back of the book, due to the relation of the grain direction of the sheets of paper used for the jobs 38. Moreover, on the condition that the grain direction is changed, then the vertical directions of the pages must also be changed. To meet such requirements, according to the first through third modifications, a process is carried out for changing the position of the back while also changing the vertical directions of the pages.

The first through third modifications will be described successively below.

[First Modification]

According to the first modification shown in FIGS. 8 through 12, on the condition that the user indicates a change or rotation in the vertical direction of a top page (first page), the vertical direction of the top page is rotated, and the vertical directions of the other pages also are rotated in unison together with rotation of the vertical direction of the top page.

Figure 8:
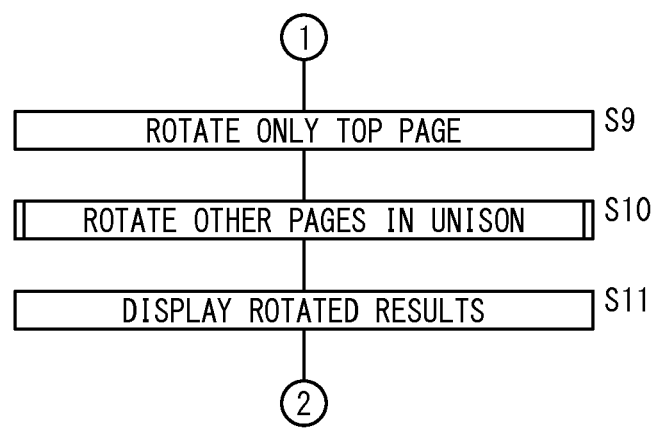
FIG. 8 is a flowchart of a first modification.
Figure 9A:
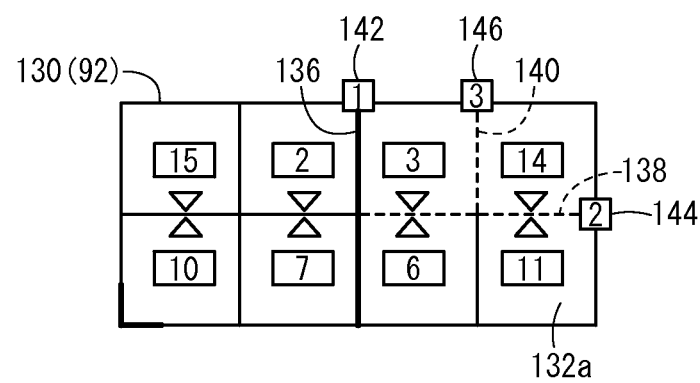
FIG. 9A is a view showing the front side of a hypothetical printed sheet according to the first modification.
Figure 9B:
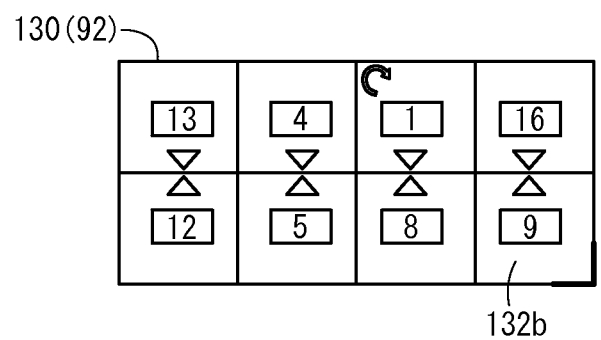
FIG. 9B is a view showing the rear side of the hypothetical printed sheet according to the first modification.

FIG. 8 is a flowchart of the first modification. FIGS. 9A and 9B show display details of respective front and reverse sides of a single sheet 130 for a hypothetical print product 92, which are displayed on the editing screen 110.

In FIGS. 9A and 9B, eight pages 132a, 132b are assigned respectively to the front and reverse sides of the sheet 130. Fold lines 136, 138, 140 and areas 142, 144, 146 indicative of folding sequences also are displayed on the front side of the sheet 130.

In the case that the user observes the sheet 130 displayed on the editing screen 110 (step S7 of FIG. 3) and judges that the vertical directions of the pages 132a, 132b need to be rotated, e.g., rotated in a clockwise direction through 90°, the user operates the mouse 34 to click on the first page (page 132b) on the reverse side thereof. The rotation indicating portion 60 receives instructions for rotating the first page, supplies the received instructions to the control portion 42, and displays a rotation arrow on the page 132b.

In step S9, according to the entered instructions, the rotation processing portion 68 reads out as default values from the imposition data accumulating portion 78 the imposition data, i.e., the imposition data including the grid data and the fold data, and rotates the vertical direction of the first page of the read imposition data clockwise through 90°.

Next, in step S10, in the same manner as with the first page, the rotation processing portion 68 also rotates the vertical directions of the other pages 132a, 132b. At this time, the rotation processing portion 68 rotates the vertical directions of the other pages 132a, 132b in agreement with the rotated vertical direction of the first page. A specific rotating process will be described later.

In the following step S11, the rotation processing portion 68 supplies the rotated imposition data to the imposition data generating portion 64. The imposition data generating portion 64 accumulates the rotated imposition data as new imposition data in the imposition data accumulating portion 78, and supplies the rotated imposition data to the display data generating portion 66. The display data generating portion 66 generates raster-format data depending on the supplied rotated imposition data, and the display control portion 46 supplies a display control signal based on the raster-format data to the display portion 28.

Figure 10A:
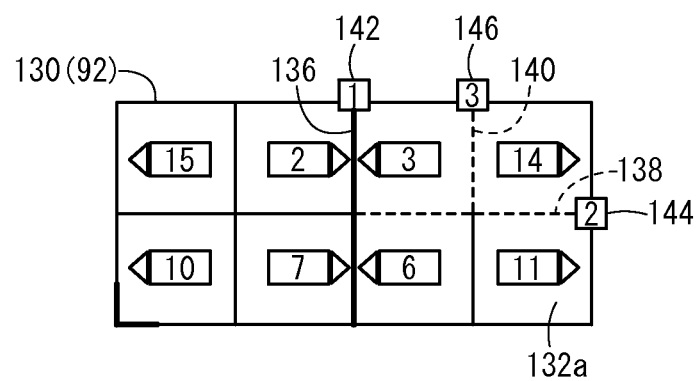
FIG. 10A is a view showing the front side of the hypothetical printed sheet with pages, the vertical directions of which are rotated according to the first modification.
Figure 10B:
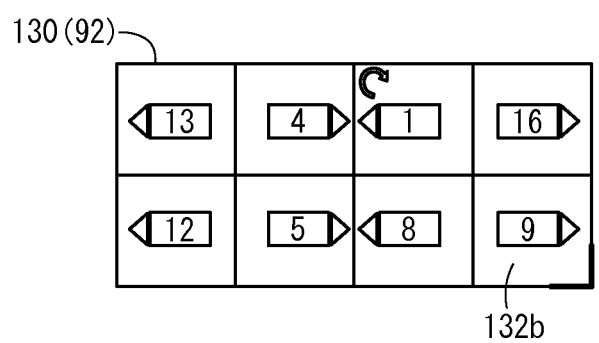
FIG. 10B is a view showing the rear side of the hypothetical printed sheet with pages, the vertical directions of which are rotated according to the first modification.

As shown in FIGS. 10A and 10B, the display portion 28 displays the hypothetical print product 92 with the rotated imposition data imposed thereon in the display area 112 of the editing screen 110. Upon observing the displayed hypothetical print product 92 in the display area 112, the user can confirm that the vertical directions of all of the pages 132a, 132b have been changed as instructed by the user.

An algorithm of the rotating process, which is performed in step S10, will be described below with reference to FIGS. 11 and 12.

Figure 11:
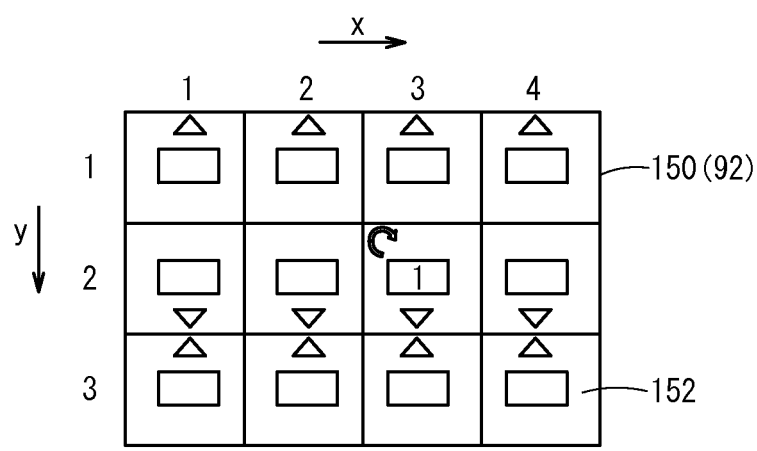
FIG. 11 is a view illustrative of an algorithm for rotating other pages aside from a top page according to the first modification.

FIG. 11 shows by way of example a single sheet 150 for the hypothetical print product 92 with a plurality of pages 152 assigned thereto. More specifically, a total of twelve pages 152, which are in the form of a matrix made up of 4 columns arrayed along an x direction and 3 rows arrayed along a y direction, are assigned to the single sheet 150.

Figure 12:
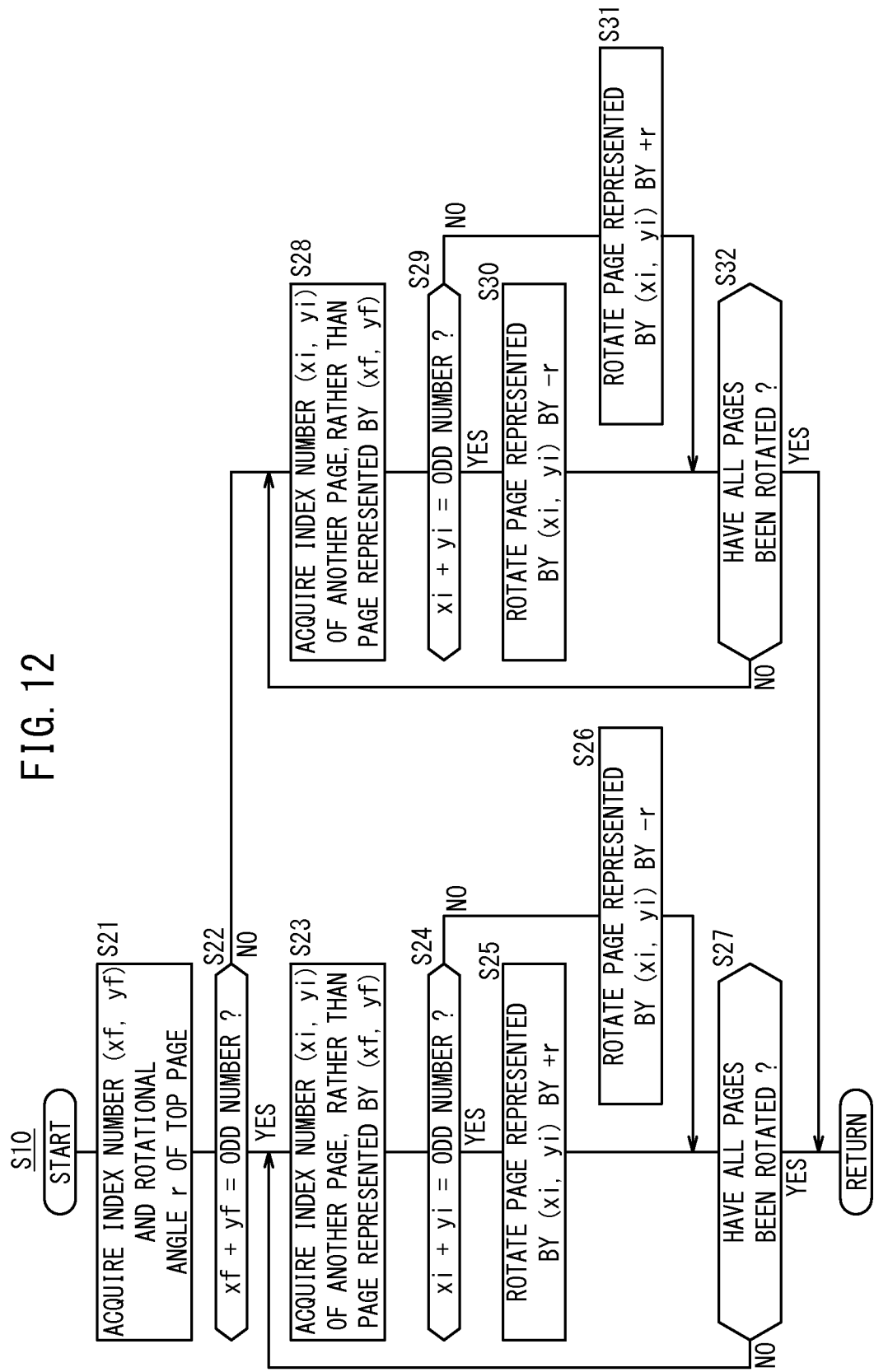
FIG. 12 is a flowchart of the algorithm for rotating other pages.

In step S21 of FIG. 12, the rotation processing portion 68 acquires an index number (xf, yf) representing the column and row of the top page (first page) on the sheet 150, together with a rotational angle r of the top page.

As described above, prior to step S9 of FIG. 8, the rotation processing portion 68 has received instructions from the user concerning the rotation of the vertical direction of the first page. Therefore, according to the received instructions, the rotation processing portion 68 identifies the index number (xf, yf) of the first page, and associates the identified index number (xf, yf) with the rotational angle r (e.g., a 90° angle in a clockwise direction).

In step S22, the rotation processing portion 68 judges whether or not the value of (xf+yf) is odd.

On the condition that the value of (xf+yf) is odd (step S22: YES), then in step S23, the rotation processing portion 68 acquires the index number (xi, yi) of another page 152, rather than the first page represented by the index number (xf, yf).

In step S24, the rotation processing portion 68 judges whether or not the value of (xi+yi) of the other page 152 is odd.

On the condition that the value of (xi+yi) is odd (step S24: YES), then in step S25, the rotation processing portion 68 rotates the vertical direction of the page 152, which is represented by the index number (xi, yi), through a rotational angle +r (e.g., a 90° angle in a clockwise direction).

On the condition that the value of (xi+yi) is even (step S24: NO), then in step S26, the rotation processing portion 68 rotates the vertical direction of the page 152 represented by the index number (xi, yi) through a rotational angle −r, (e.g., a 90° angle in a counterclockwise direction).

In the following step S27, the rotation processing portion 68 judges whether or not the vertical directions have been rotated with respect to all of the pages 152 on the sheet 150. On the condition that the vertical directions have not been rotated with respect to all of the pages 152 on the sheet 150 (step S27: NO), then control returns to step S23. In step S23, the rotation processing portion 68 acquires the index number (xi, yi) of a remaining page 152, and repeats steps S24 through S27 on the remaining page 152.

In this manner, the rotation processing portion 68 performs the rotating process for rotating the vertical directions of all of the pages 152 on the sheet 150. In other words, simply by the user's operating of the mouse 34 in order to indicate a change in the vertical direction of the first page, the rotation processing portion 68 changes the vertical directions of all of the pages 152 including the first page. On the condition that the vertical directions of all of the pages 152 on the sheet 150 have been rotated (step S27: YES), then control proceeds to step S11 of FIG. 8.

On the condition that the value of (xf+yf) is even (step S22: NO) in step S22, then in step S28, in the same manner as in step S23, the rotation processing portion 68 acquires the index number (xi, yi) of another page 152, rather than the first page represented by the index number (xf, yf).

In step S29, in the same manner as in step S24, the rotation processing portion 68 judges whether or not the value of the index number (xi+yi) of the other page 152 is odd.

On the condition that the value of (xi+yi) is odd (step S29: YES), then in step S30, in the same manner as in step S26, the rotation processing portion 68 rotates the vertical direction of the page 152 represented by the index number (xi, yi) through a rotational angle −r (e.g., a 90° angle in a counterclockwise direction).

On the condition that the value of the index number (xi+yi) is even (step S29: NO), then in step S31, in the same manner as in step S25, the rotation processing portion 68 rotates the vertical direction of the page 152 represented by the index number (xi, yi) through a rotational angle +r (e.g., a 90° angle in a clockwise direction).

In the following step S32, the rotation processing portion 68 judges whether or not the vertical directions have been rotated with respect to all of the pages 152 on the sheet 150. On the condition that the vertical directions have not been rotated with respect to all of the pages 152 on the sheet 150 (step S32: NO), then control returns to step S28. In step S28, the rotation processing portion 68 acquires the index number (xi, yi) of a remaining page 152, and repeats steps S29 through S32 on the remaining page 152.

In this manner, the rotation processing portion 68 also performs the rotating process for rotating the vertical directions of all of the pages 152 on the sheet 150. In other words, simply by the user's operating of the mouse 34 in order to indicate a change in the vertical direction of the first page, the rotation processing portion 68 changes the vertical directions of all of the pages 152 including the first page. On the condition that the vertical directions of all of the pages 152 on the sheet 150 have been rotated (step S32: YES), then control proceeds to step S11 of FIG. 8.

[Second Modification]

According to the second modification shown in FIGS. 13A through 15, on the condition that the user indicates one of the four sides 154 of the top page (first page) on the sheet 130 as being the position of a back 156 of the final print product 40 (casebound book), the vertical directions of all of the pages 132a, 132b are automatically changed corresponding to the indicated position of the back 156.

Figure 13A:
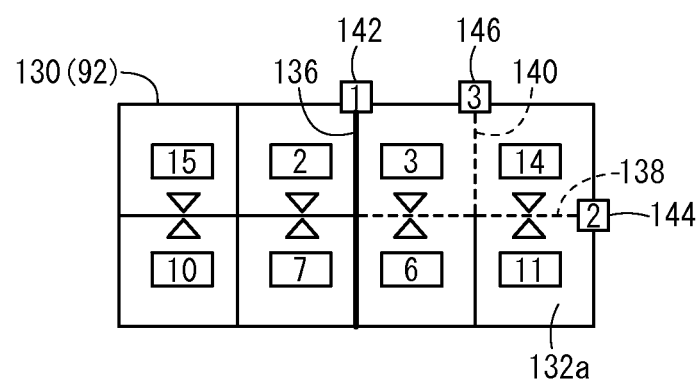
FIG. 13A is a view showing the front side of a hypothetical printed sheet according to a second modification.
Figure 13B:
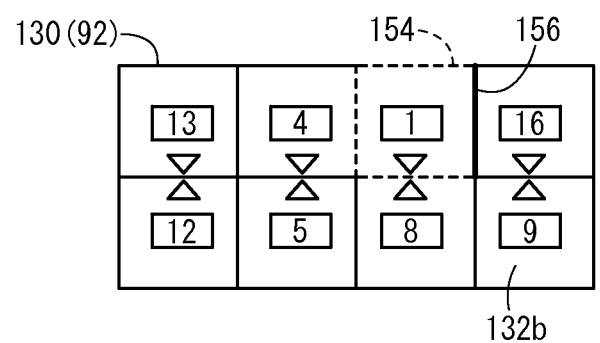
FIG. 13B is a view showing the reverse side of the hypothetical printed sheet according to the second modification.
Figure 14A:
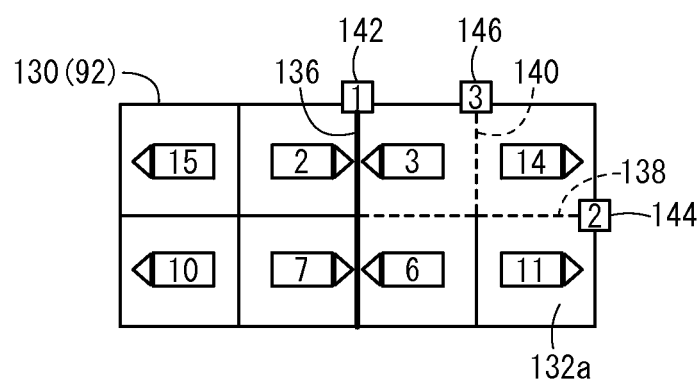
FIG. 14A is a view showing the front side of the hypothetical printed sheet with pages, the vertical directions of which are rotated according to the second modification.
Figure 14B:
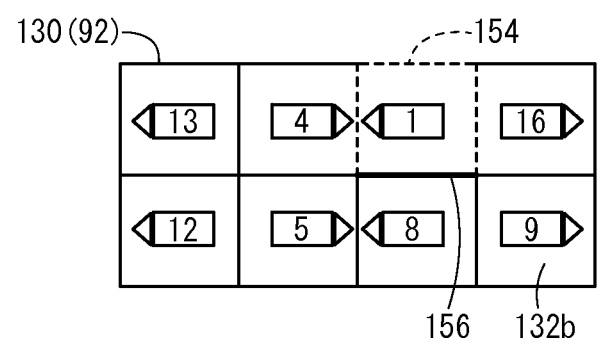
FIG. 14B is a view showing the reverse side of the hypothetical printed sheet with pages, the vertical directions of which are rotated according to the second modification.

FIGS. 13A and 13B show the state of the sheet 130 for the hypothetical print product 92 before changing the position of the back 156. FIGS. 14A and 14B show the state of the sheet 130 for the hypothetical print product 92 after changing the position of the back 156. The position of the back 156 shown in FIGS. 13A and 13B is a default position. According to the second modification, the position of the back 156 is changed from the default position to a position desired by the user.

Figure 15:
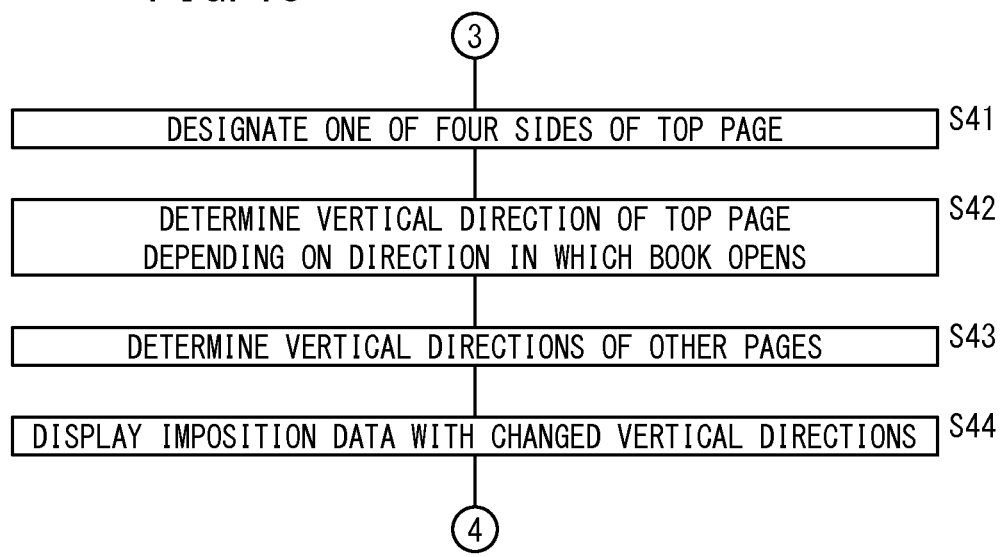
FIG. 15 is a flowchart of the second modification.

On the condition that the user observes the sheet 130 displayed on the editing screen 110 (step S7 in FIG. 3) and determines that it is necessary to change the position of the back 156 from the position shown in FIG. 13B to the position shown in FIG. 14B, then in step S41 of FIG. 15, the user operates the mouse 34 in order to click on a line, i.e., a lower side 154 of the first page, that separates the first page and the eighth page from each other. The back position designating portion 62 receives instructions from the user to change the position of the back 156, supplies the received instructions to the control portion 42, and displays a thick line representing the back 156 on the side 154 that has been clicked on.

In step S42, according to the entered instructions, the vertical direction determining portion 70 reads out the imposition data from the imposition data accumulating portion 78, and determines a vertical direction of the first page (page 132b) of the read imposition data depending on the indicated position of the back 156 and the direction in which the casebound book is opened.

On the condition that the casebound book is bound on the left side, the position of the back 156 is on the right side of the first page. On the condition that the casebound book is bound on the right side, the position of the back 156 is on the left side of the first page. Therefore, the vertical direction of the first page can be determined from the position of the back 156 and the direction in which the casebound book opens. The direction in which the casebound book opens may be indicated together with the position of the back 156 by the user operating the mouse 34, or may be accumulated together with the imposition data in advance in the imposition data accumulating portion 78.

In the following step S43, the vertical direction determining portion 70 also determines vertical directions of the other pages 132a, 132b based on the vertical direction of the first page 132b and the position of the back 156. At this time, the vertical direction determining portion 70 determines vertical directions of the other pages 132a, 132b, which are in agreement with the vertical direction of the first page and the position of the back 156. More specifically, the vertical direction determining portion 70 determines vertical directions of odd-numbered pages 132a, 132b so as to agree with the vertical direction of the first page, and determines vertical directions of even-numbered pages 132a, 132b so as to be opposite to the vertical direction of the first page.

In the following step S44, the vertical direction determining portion 70 supplies the imposition data, in which the position of the back 156 and the vertical directions have been changed, to the imposition data generating portion 64. The imposition data generating portion 64 accumulates the changed imposition data as new imposition data in the imposition data accumulating portion 78, and supplies the changed imposition data to the display data generating portion 66. The display data generating portion 66 generates raster-format data depending on the supplied imposition data, and the display control portion 46 supplies a display control signal based on the raster-format data to the display portion 28.

As shown in FIGS. 14A and 14B, the display portion 28 displays the hypothetical print product 92 with the changed imposition data imposed thereon in the display area 112 of the editing screen 110. By observing the displayed hypothetical print product 92 in the display area 112, the user can confirm that the position of the back 156 and the vertical directions of all of the pages 132a, 132b have been changed as instructed by the user.

[Third Modification]

According to the third modification, as shown in FIGS. 16A through 20, on the condition that the grain direction of the sheet 130 and the direction of the back 156 are not in agreement with each other, then the position of the back 156 is automatically changed in order to bring the direction of the back 156 into agreement with the grain direction. Further, the vertical directions of the pages 132a, 132b are automatically changed depending on the changed position of the back 156. According to the third modification, therefore, on the condition that the grain direction and the direction of the back 156 are not in agreement with each other, then the position of the back 156 and the vertical directions are changed without the need for the user to operate the mouse 34.

In an actual bookbinding process, a job 38 is produced from a sheet 160 of rolled paper, as shown in FIGS. 16A through 17B. The sheet 160 of rolled paper has a grain along the direction in which the sheet 160 of rolled paper is fed (sheet feeding direction). For producing a job 38 from the sheet 160 of rolled paper and folding the job 38 into a signature, it is necessary for the direction of the back of a final print product 40 and the grain direction to be maintained in agreement with each other. On the condition that the direction of the back of the final print product 40 and the grain direction are not in agreement with each other, then in the event that the back is bonded to the signature to produce a casebound book, the back may not stick snugly at the time of bonding, or opening of the casebound book may be difficult to perform.

Furthermore, the sheet 160 of rolled paper may initially be folded with respect to the sheet feeding direction, and thereafter, the sheet 160 may be folded into a Z fold (six-page accordion). In this case, due to the relationship between the width of the sheet 160 of rolled paper and the imposed job 38, it may be desirable for pages 162a, 162b to be laid out in a longitudinal direction along the sheet feeding direction on the sheet 160 of rolled paper, rather than assigning the pages 162a, 162b transversely across the sheet 160 of rolled paper, i.e., along a transverse direction perpendicular to the sheet feeding direction, as shown in FIGS. 16A and 16B.

Figure 16A:
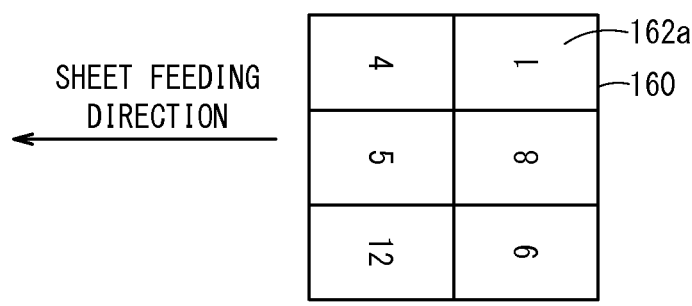
FIGS. 16A and 16B are views showing the relationship between a sheet of rolled paper and a direction in which the sheet is fed.
Figure 16B:
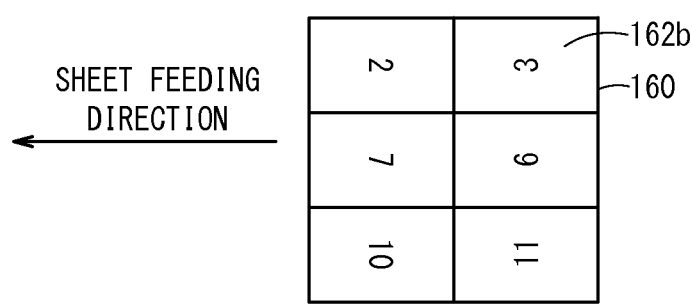
Figure 17A:
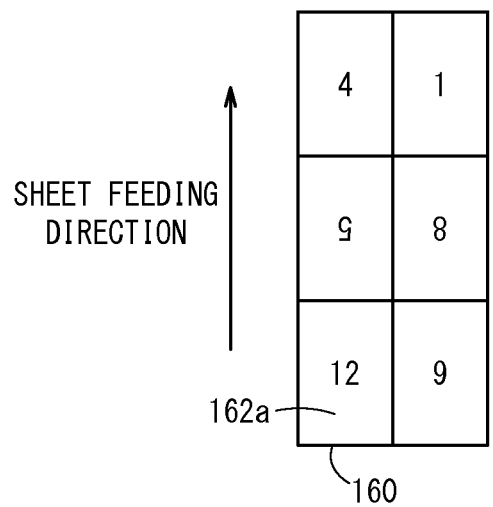
FIGS. 17A and 17B are views showing the relationship between a sheet of rolled paper and a direction in which the sheet is fed.
Figure 17B:
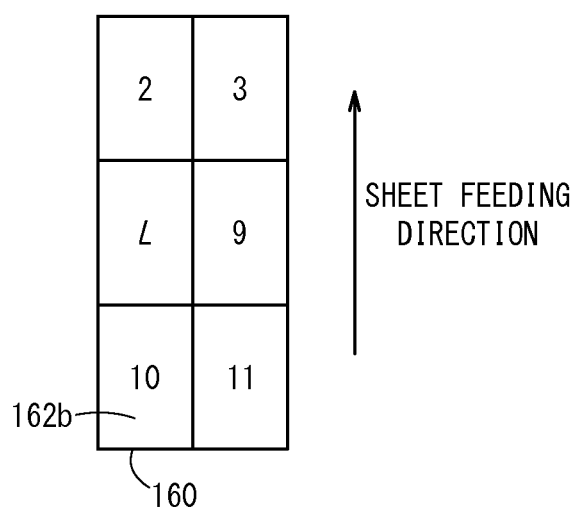
Figure 18A:
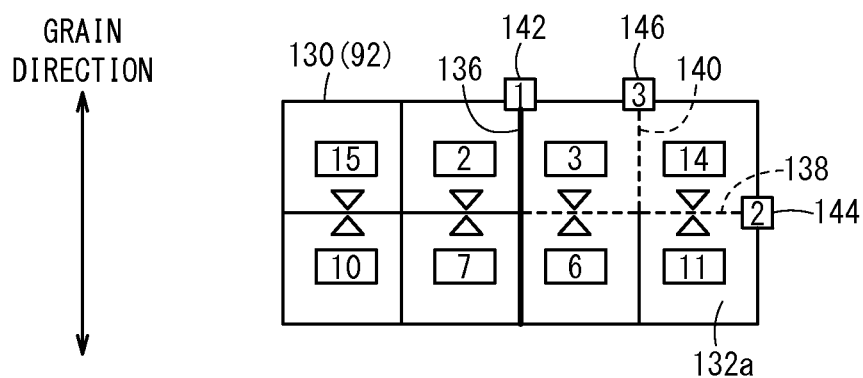
FIG. 18A is a view showing the front side of a hypothetical printed sheet according to a third modification.
Figure 18B:
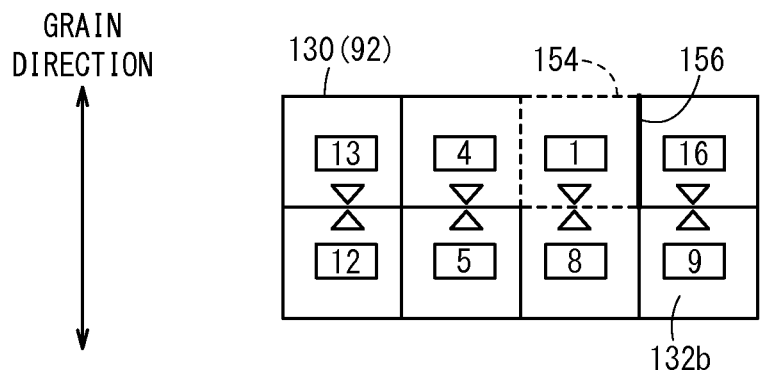
FIG. 18B is a view showing the reverse side of the hypothetical printed sheet according to the third modification.
Figure 19A:
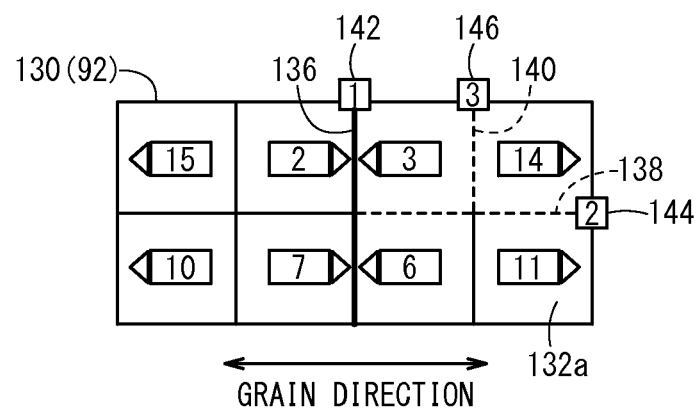
FIG. 19A is a view showing the front side of the hypothetical printed sheet with pages, the vertical directions of which are rotated according to the third modification.
Figure 19B:
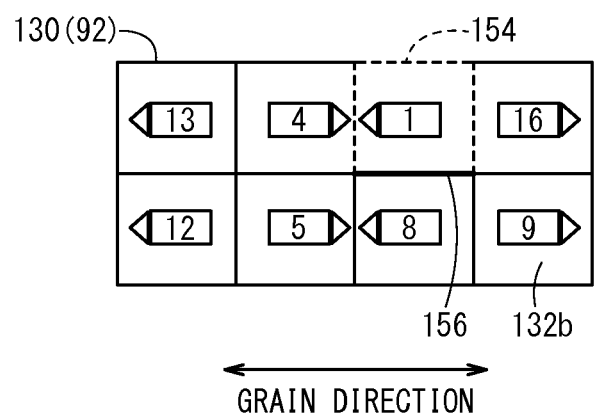
FIG. 19B is a view showing the reverse side of the hypothetical printed sheet with pages, the vertical directions of which are rotated according to the third modification.

However, on the condition that the pattern of imposition data is changed from the pattern shown in FIGS. 16A and 16B to the pattern shown in FIGS. 17A and 17B, thereby changing the imposition data from fold data to grid data, then the imposition data cannot be supplied to the printing site 16 and the bookbinding site 18 in a format according to the JDF Specification. As a result, the job 38 cannot be folded into a signature at the bookbinding site 18. Therefore, even on the condition that the pattern of imposition data is rotated, it is necessary for the rotated imposition data to be maintained in a format according to the JDF Specification, thereby allowing the job 38 to be folded into a signature at the bookbinding site 18.

According to the third modification, on the condition that the grain direction of the sheet 130 and the direction of the back 156 are not in agreement with each other, the position of the back 156 is changed in order to bring the direction of the back 156 into agreement with the grain direction. Further, the vertical directions of the pages 132a, 132b also are changed depending on the changed position of the back 156. FIGS. 18A through 19B show states of the sheet 130 after the position of the back 156 and the vertical directions of the pages 132a, 132b have been changed.

Figure 20:
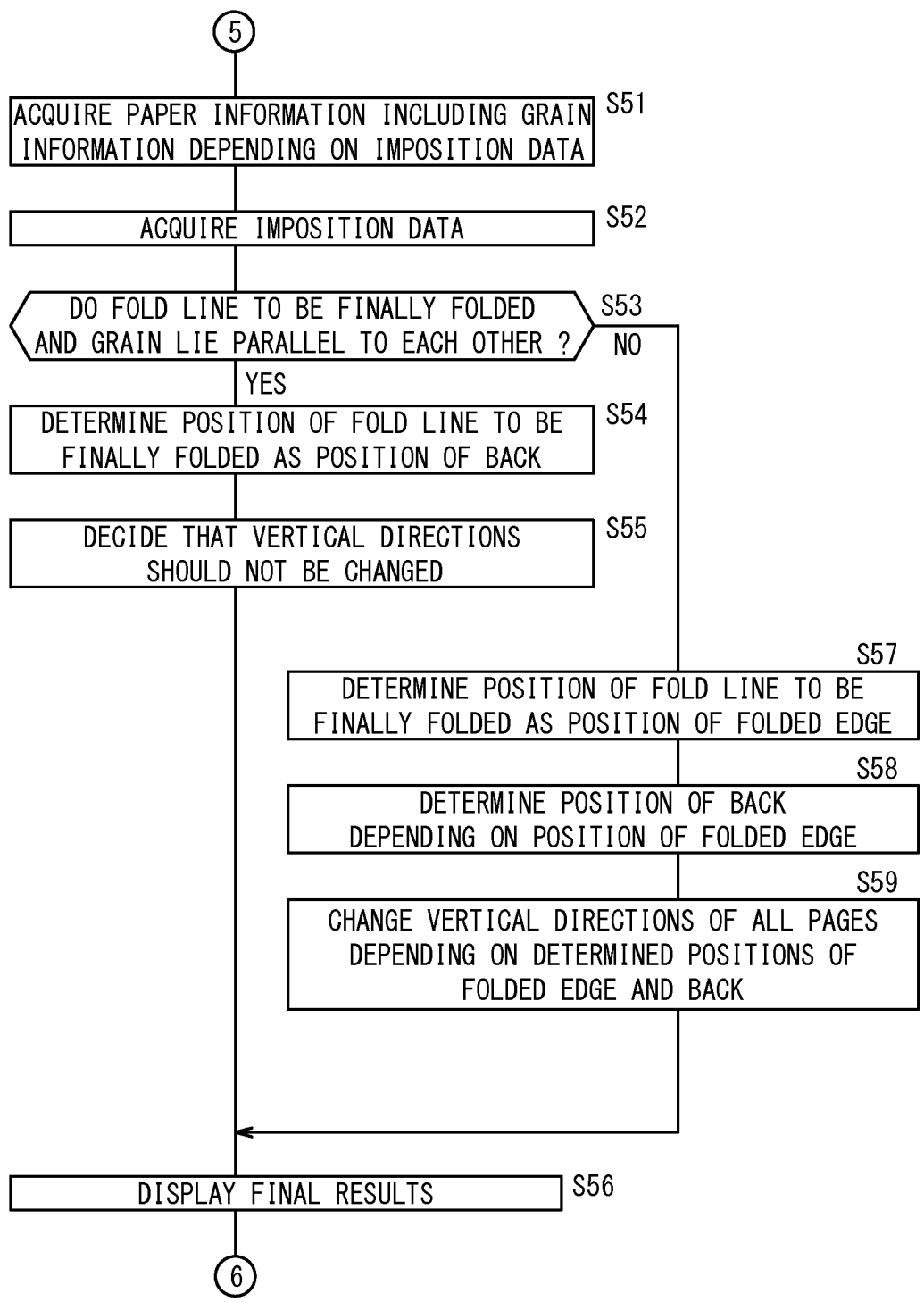
FIG. 20 is a flowchart of the third modification.

More specifically, in step S51 of FIG. 20, after the imposition data in the form of grid data and fold data are displayed on the editing screen 110, as indicated in step S7 of FIG. 3, the back position determining portion 72 acquires paper information including grain information from the paper information accumulating portion 76. Further, in step S52, the back position determining portion 72 reads out imposition data from the imposition data accumulating portion 78.

In step S53, the back position determining portion 72 judges whether or not a fold line to be finally folded, which is included in the imposition data, and the grain of the sheet 160 of rolled paper, which represents the sheet 130, lie parallel to each other. In other words, the back position determining portion 72 judges whether or not the direction of a fold line to be finally folded and the grain direction are in agreement with each other.

On the condition that the direction of the fold line and the grain direction are in agreement with each other (step S53: YES), then in step S54, the back position determining portion 72 determines the position of the fold line to be finally folded as the position of the back 156. In this case, as prescribed by the JDF Specification, the position of the fold line to be finally folded, which is included in the imposition data, serves as the position of the back 156. In step S55, the back position determining portion 72 decides that the vertical directions of the pages 132a, 132b should not be changed. In other words, since the direction of the fold line to be finally folded and the grain direction are in agreement with each other, the back position determining portion 72 decides that a process of changing the imposition data should not be performed.

The back position determining portion 72 sends information, which indicates that the imposition data have not been changed, to the display control portion 46. The display control portion 46 generates a display control signal based on the supplied information, and supplies the display control signal to the display portion 28, which displays the information on the editing screen 110 in step S56. By observing the details on the editing screen 110, the user can recognize that the imposition data have not been changed due to the fact that the direction of the back 156 and the grain direction are in agreement with each other.

On the condition that the fold line to be finally folded and the grain do not lie parallel to each other, i.e., on the condition that the direction of the fold line to be finally folded and the grain direction are not in agreement with each other (step S53: NO), then in step S57, the back position determining portion 72 decides that the position of the fold line to be finally folded, which is set in the imposition data, should be changed to a position depending on the folded edge of the final print product 40.

In step S58, depending on the position of the folded edge, the back position determining portion 72 determines a side 154 parallel to the grain direction, from among the four sides 154 of the first page 132b, as the new position of the back 156. The back position determining portion 72 reflects the folded edge and the determined new position of the back 156 in the imposition data, and supplies the imposition data to the vertical direction determining portion 70.

Based on the position of the folded edge and the new position of the back 156, which are contained in the imposition data supplied from the back position determining portion 72, the vertical direction determining portion 70 determines new vertical directions of all of the pages 132a, 132b. At this time, in step S59, the vertical direction determining portion 70 determines new vertical directions of all of the pages 132a, 132b so as to agree with the position of the folded edge and the new position of the back 156.

In particular, the vertical direction determining portion 70 determines new vertical directions of all of the pages 132a, 132b in a head-to-head and tail-to-tail layout, depending on the position of the folded edge and the new position of the back 156. More specifically, the vertical direction determining portion 70 acquires information for a head-to-head and tail-to-tail layout from the paper information and the initial imposition data, which is read out from the imposition data accumulating portion 78 by the back position determining portion 72, and determines new vertical directions of all of the pages 132a, 132b based on the acquired information, the position of the folded edge, and the new position of the back 156. The vertical direction determining portion 70 reflects the determined vertical directions in the imposition data, and supplies the imposition data to the imposition data generating portion 64.

The imposition data generating portion 64 accumulates the imposition data, which is supplied from the vertical direction determining portion 70, as new imposition data in the imposition data accumulating portion 78, and supplies the new imposition data to the display data generating portion 66. Depending on the supplied new imposition data, the display data generating portion 66 generates raster-format data, and the display control portion 46 supplies a display control signal based on the raster-format data to the display portion 28.

As shown in FIGS. 18A through 19B, in step S56, the display portion 28 displays the hypothetical print product 92 with the changed imposition data imposed thereon in the display area 112 of the editing screen 110. By observing the displayed hypothetical print product 92 in the display area 112, the user can confirm that the position of the back 156 has been changed, and further that the vertical directions of all of the pages 132a, 132b have been changed in accordance with the grain direction.

[Advantages of the Present Embodiment]

According to the present embodiment, as described above, on the condition that the fold line information addition indicating portion 56 instructs the imposition data generating portion 64 to add fold line information, the imposition data generating portion 64 adds fold data (fold line information) to imposition data in the form of grid data. At the bookbinding site 18, a job 38, together with the added imposition data imposed thereon, can be folded into a signature according to the fold data that is added to the imposition data.

According to the present embodiment, therefore, simply by adding fold data to imposition data in the form of grid data, a job 38 with grid data imposed thereon can be folded into a signature at the bookbinding site 18. The added fold data are used to send information concerning fold lines, etc., to the bookbinding site 18, to thereby enable the bookbinding site 18 to fold a job 38 properly into a signature.

In the case that the fold line information entering portion 58 sends fold line information to the imposition data generating portion 64, and after the fold line information addition indicating portion 56 has instructed the imposition data generating portion 64 to add fold line information, the imposition data generating portion 64 adds fold data to the imposition data according to the received fold line information. Since the fold data are added to the imposition data as instructed by the user, the imposition data can be imposed easily.

The imposition data generating portion 64 temporarily accumulates imposition data in the form of grid data in the page information accumulating portion 74. On the condition that instructed to do so by the fold line information addition indicating portion 56, the imposition data generating portion 64 reads out the imposition data from the page information accumulating portion 74. Further, on the condition that instructed to enter fold line information by the fold line information entering portion 58, the imposition data generating portion 64 adds fold data to the imposition data. Thus, the imposition data generating portion 64 is capable of generating new imposition data for imposing grid data and fold data on a hypothetical print product 92.

According to the present embodiment, furthermore, the process of editing imposition data, which is carried out by the imposition data generating portion 64, is displayed in the editing screen 110 on the display portion 28. On the condition that the fold line information addition indicating portion 56 instructs the imposition data generating portion 64 to add fold line information, then the editing screen 110 displays, in succession, a hypothetical print product 92 with no data imposed thereon, the imposition of fold data on the hypothetical print product 92, and the imposition of grid data on the hypothetical print product 92. Since successive steps of the process of editing imposition data are displayed on the editing screen 110, it is easy and convenient for the user to carry out the imposition process.

According to the first modification, in a case where the user provides instructions to rotate the vertical direction of only the top page (first page), the vertical directions of other pages 132a, 132b, 152 also are rotated in unison therewith. Consequently, the imposition process can be carried out as desired by the user.

More specifically, based on the index number (xf, yf) and the rotational angle r of the top page, and the index number (xi, yi) of the other pages 152, the other pages 152 are rotated through an angle (+r or −r) depending on the rotational angle r. Consequently, the other pages 152 can be rotated accurately and efficiently.

According to the second modification, on the condition that the user indicates a desired side 154 as the position of the back 156, the vertical directions of all of the pages 132a, 132b are automatically changed depending on the indicated position of the back 156. Therefore, the user finds it easy and convenient to carry out the imposition process.

According to the third modification, on the condition that the direction of a fold line to be finally folded and the grain direction are not in agreement with each other, then the position of the fold line to be finally folded is set at the position of the folded edge, and a new position of the back 156 is determined from the position of the folded edge. Based on the position of the folded edge and the new position of the back 156, new vertical directions of all of the pages 132a, 132b are determined, and the present vertical directions of all of the pages 132a, 132b are changed to the new vertical directions. Consequently, the position of the back 156 can automatically be determined based on the grain direction, and the vertical directions of all of the pages 132a, 132b can automatically be determined corresponding to the determined position of the back 156. Inasmuch as the vertical directions and the direction of the back 156 are brought into agreement with the grain direction, the back of a casebound book having the pages 132a, 132b sticks snugly at the time of bonding at the bookbinding site 18, and the casebound book can be opened easily.

Although preferred embodiments of the present invention have been described above, it should be understood that the present invention is not limited to the illustrated embodiments, but various changes and modifications may be made to the embodiments without departing from the scope of the invention as set forth in the appended claims.

What is claimed is:

1. A data editing apparatus for editing imposition data to be imposed on at least one print product having a plurality of pages, comprising:
   a data editing portion for editing grid data, which define page numbers and vertical directions of the pages in order to generate the imposition data; and
   a fold data editing indicating portion for instructing to edit fold data, which define positions of fold lines, folding directions, and a folding sequence by which the print product is folded into a signature;
   wherein, in a case that the data editing portion is instructed to edit the fold data by the fold data editing indicating portion, the data editing portion adds the fold data to the imposition data; said apparatus further comprising:
   a storage portion for storing the imposition data;
   wherein the data editing portion generates first imposition data by imposing the grid data on a hypothetical print product simulating the print product, and stores the first imposition data in the storage portion; and
   in the case that the data editing portion is instructed to edit the fold data by the fold data editing indicating portion, the data editing portion reads out the first imposition data from the storage portion, and adds the fold data to the first imposition data that is read out from the storage portion, thereby generating second imposition data in which the grid data and the fold data are imposed on the hypothetical print product; and further comprising:
   a display portion for displaying the hypothetical print product;
   wherein the display portion displays a process of generating the first imposition data that is carried out by the data editing portion;
   in the case that the data editing portion is instructed to edit the fold data by the fold data editing indicating portion, the display portion switches to displaying the hypothetical print product with no data imposed thereon; and
   the display portion displays, in succession, imposition of the fold data on the hypothetical print product, and imposition of the grid data of the first imposition data on the hypothetical print product with the fold data imposed thereon, thereby displaying a process of generating the second imposition data.

2. The data editing apparatus according to claim 1, further comprising:
   a rotation indicating portion for indicating a rotation of a top page of the hypothetical print product, which corresponds to a top page of a final product obtained by performing a subsequent process on the print product, the subsequent process including the formation of the signature, on a condition that the hypothetical print product with the second imposition data imposed thereon is displayed on the display portion; and
   a rotation processing portion for rotating other pages of the hypothetical print product in unison with the rotation of the top page of the hypothetical print product;
   wherein, in a case that the rotation processing portion has rotated the other pages of the hypothetical print product, the display portion displays the hypothetical print product in which the pages thereof have been rotated, rather than the hypothetical print product in which the pages thereof have not been rotated.

3. The data editing apparatus according to claim 2, wherein the rotation indicating portion indicates to the rotation processing portion a rotational angle of the top page of the hypothetical print product; and
   in a case that a plurality of pages are formed in the hypothetical print product, the rotation processing portion rotates the other pages through a predetermined angle depending on the rotational angle, based on the position and rotational angle of the top page of the hypothetical print product, and the positions of the other pages of the hypothetical print product.

4. The data editing apparatus according to claim 1, further comprising:
   a back position designating portion for designating one of four sides of a top page of the hypothetical print product, which corresponds to a top page of a final product obtained by performing a subsequent process on the print product, the subsequent process including the formation of the signature, as the position of a back of the final product, on a condition that the hypothetical print product with the second imposition data imposed thereon is displayed on the display portion; and
   a vertical direction determining portion for determining vertical directions of all of the pages of the hypothetical print product depending on the position of the back designated by the back position designating portion, and changing the present vertical positions of all of the pages to the determined vertical positions;
   wherein, in a case that the present vertical positions of all of the pages are changed to the determined vertical positions by the vertical direction determining portion, the display portion displays the hypothetical print product in which vertical directions of the pages are changed, rather than the hypothetical print product in which vertical directions of the pages are not changed.

5. The data editing apparatus according to claim 1, further comprising:
   a back position determining portion for determining one of four sides of a top page of the hypothetical print product, which corresponds to a top page of a final product obtained by performing a subsequent process on the print product, the subsequent process including the formation of the signature, based on grain information representing a grain direction of the print product, as the position of a back of the final product, on a condition that the hypothetical print product with the second imposition data imposed thereon is displayed on the display portion; and
   a vertical direction determining portion for determining vertical directions of all of the pages of the hypothetical print product depending on the position of the back determined by the back position determining portion, and for changing the present vertical positions of all of the pages to the determined vertical positions;
   wherein, in a case that the present vertical positions of all of the pages are changed to the determined vertical positions by the vertical direction determining portion, the display portion displays the hypothetical print product in which vertical directions of the pages are changed, rather than the hypothetical print product in which vertical directions of the pages are not changed.

6. The data editing apparatus according to claim 5, wherein, in the case that the position of a fold line to be finally folded to produce the signature is preset as the position of the back of the final product, on a condition that the direction of the fold line to be finally folded agrees with the grain direction, the back position determining portion maintains the position of the back, and the vertical direction determining portion does not change the vertical directions of all of the pages; and on a condition that the direction of the fold line to be finally folded does not agree with the grain direction, the back position determining portion sets the position of the fold line to be finally folded as the position of a folded edge of the final product and determines a new position of the back based on the position of the folded edge, and the vertical direction determining portion determines vertical directions of all of the pages based on the position of the folded edge and the new position of the back, and changes the present vertical positions of all of the pages to the determined vertical positions.

7. A data editing method for editing imposition data to be imposed on at least one print product having a plurality of pages, comprising the steps of:

editing, by a data editing portion, grid data, which define page numbers and vertical directions of the pages in order to generate the imposition data, as a first step;

instructing, by a fold data editing indicating portion, the data editing portion to edit fold data, which define positions of fold lines, folding directions, and a folding sequence by which the print product is folded into a signature, as a second step; and instructing, by the fold data editing indicating portion to update positions of the fold lines, the data editing portion to add the updated fold data to the generated imposition data, as a third step:

said method further comprising:

storing the imposition data in a storage portion;

wherein the data editing portion generates first imposition data by imposing the grid data on a hypothetical print product simulating the print product, and stores the first imposition data in the storage portion; and in the case that the data editing portion is instructed to edit the fold data by the fold data editing indicating portion, the data editing portion reads out the first imposition data from the storage portion, and adds the fold data to the first imposition data that is read out from the storage portion, thereby generating second imposition data in which the grid data and the fold data are imposed on the hypothetical print product; and further comprising:

displaying, by a display portion, the hypothetical print product;

wherein the display portion displays a process of generating the first imposition data that is carried out by the data editing portion;

in the case that the data editing portion is instructed to edit the fold data by the fold data editing indicating portion, the display portion switches to displaying the hypothetical print product with no data imposed thereon; and the display portion displays, in succession, imposition of the fold data on the hypothetical print product, and imposition of the grid data of the first imposition data on the hypothetical print product with the fold data imposed thereon, thereby displaying a process of generating the second imposition data.

8. A non-transitory recording medium that stores a program for enabling a computer to function as a unit for editing imposition data to be imposed on at least one print product having a plurality of pages, the program enabling the computer to function as:

a data editing portion for editing grid data, which define page numbers and vertical directions of the pages in order to generate the imposition data; and a fold data editing indicating portion for instructing to edit fold data, which define positions of fold lines, folding directions, and a folding sequence by which the print product is folded into a signature;

wherein, in a case that the data editing portion is instructed to edit the fold data by the fold data editing indicating portion to update positions of the fold lines, the data editing portion adds the updated fold data to the generated imposition data, and said program on the non-transitory recording medium further enabling the computer to function as:

a storage portion for storing the imposition data;

wherein the data editing portion generates first imposition data by imposing the grid data on a hypothetical print product simulating the print product, and stores the first imposition data in the storage portion; and in the case that the data editing portion is instructed to edit the fold data by the fold data editing indicating portion, the data editing portion reads out the first imposition data from the storage portion, and adds the fold data to the first imposition data that is read out from the storage portion, thereby generating second imposition data in which the grid data and the fold data are imposed on the hypothetical print product; and said program on the non-transitory recording medium further enabling the computer to function as:

a display portion for displaying the hypothetical print product;

wherein the display portion displays a process of generating the first imposition data that is carried out by the data editing portion;

in the case that the data editing portion is instructed to edit the fold data by the fold data editing indicating portion, the display portion switches to displaying the hypothetical print product with no data imposed thereon; and the display portion displays, in succession, imposition of the fold data on the hypothetical print product, and imposition of the grid data of the first imposition data on the hypothetical print product with the fold data imposed thereon, thereby displaying a process of generating the second imposition data.

\* \* \* \* \*